US012657977B2

(12) United States Patent
Calo'oy et al.

(10) Patent No.: US 12,657,977 B2
(45) Date of Patent: Jun. 16, 2026

(54) LOCKER FOR MANAGING ACCESS TO DEVICES

(71) Applicant: Luxor Workspaces, LLC, Birmingham, AL (US)

(72) Inventors: Ryan Nicholas Calo'oy, Arlington, TX (US); Najee McGreen, San Jose, CA (US); Joseph Augustine Mecca, Coppell, TX (US)

(73) Assignee: Luxor Workspaces, LLC, Birmingham, AL (US)

(*) Notice: Subject to any disclaimer, the term of this patent is extended or adjusted under 35 U.S.C. 154(b) by 0 days.

(21) Appl. No.: 18/227,854

(22) Filed: Jul. 28, 2023

(65) Prior Publication Data

US 2024/0119772 A1 Apr. 11, 2024

Related U.S. Application Data

(60) Provisional application No. 63/413,320, filed on Oct. 5, 2022.

(51) Int. Cl.
*H05K 5/00* (2025.01)
*G07C 9/00* (2020.01)

(52) U.S. Cl.
CPC ..... *G07C 9/00571* (2013.01); *G07C 9/00563* (2013.01)

(58) Field of Classification Search
CPC .............................. G07C 9/00; G07C 2009/00
See application file for complete search history.

(56) References Cited

U.S. PATENT DOCUMENTS

| | | | |
|---|---|---|---|
| 4,072,223 | A | 2/1978 | Kinoshita et al. |
| 7,725,137 | B2 | 5/2010 | Lee |
| 8,471,523 | B2 | 6/2013 | Lin |
| 10,253,527 | B2 | 4/2019 | Beasley et al. |
| 10,283,984 | B2 | 5/2019 | Maguire et al. |
| 10,396,574 | B2 | 8/2019 | Maguire et al. |
| 10,439,408 | B1 | 10/2019 | Bastiyali |
| 10,742,049 | B2 | 8/2020 | Maguire et al. |
| 10,939,767 | B2 | 3/2021 | Allen et al. |
| 11,690,924 | B1 * | 7/2023 | Gokcebay ................. A61L 2/10 250/455.11 |
| 2006/0077038 | A1 * | 4/2006 | Hopkins ............ G07C 9/00912 340/5.9 |
| 2006/0121956 | A1 | 6/2006 | Lee |
| 2006/0289444 | A1 | 12/2006 | Jackson et al. |

(Continued)

*Primary Examiner* — John F Mortell
(74) *Attorney, Agent, or Firm* — Bradley Arant Boult Cummings LLP

(57) ABSTRACT

Disclosed herein is are apparatuses, systems, and methods for charging, securing, tracking, and maintaining electronic devices. More specifically, the present disclosure relates to apparatuses, systems, and methods to aid in efficient charging, securing, tracking, and maintaining devices, such as point of sale devices, without the need for direct, human oversight. Certain embodiments comprise a main device management cabinet that includes a plurality of locker compartments and a single user interface. Embodiments can comprise one or more auxiliary device management cabinets that each comprise a plurality of auxiliary locker compartments, wherein the auxiliary locker compartments are controlled by the single user interface of the main device management cabinet.

20 Claims, 20 Drawing Sheets

(56) References Cited

U.S. PATENT DOCUMENTS

| | | | | |
|---|---|---|---|---|
| 2007/0049071 | A1 | 3/2007 | Jackson et al. | |
| 2011/0089892 | A1 | 4/2011 | Lin | |
| 2011/0110026 | A1* | 5/2011 | Goza | H05K 5/30 361/679.6 |
| 2016/0258108 | A1 | 9/2016 | Jindra et al. | |
| 2017/0033579 | A1 | 2/2017 | Maguire et al. | |
| 2017/0323503 | A1 | 11/2017 | Garcia | |
| 2017/0356218 | A1 | 12/2017 | Beasley et al. | |
| 2018/0205247 | A1 | 7/2018 | Maguire et al. | |
| 2018/0262030 | A1 | 9/2018 | Zadvinskis | |
| 2018/0365641 | A1* | 12/2018 | Zhu | G06K 7/1417 |
| 2019/0319488 | A1 | 10/2019 | Allen et al. | |
| 2019/0363557 | A1 | 11/2019 | Maguire et al. | |
| 2020/0278731 | A1* | 9/2020 | Yakame | G06F 1/266 |
| 2020/0366108 | A1 | 11/2020 | Maguire et al. | |
| 2021/0170892 | A1 | 6/2021 | Albors Ripoll | |
| 2021/0186221 | A1 | 6/2021 | Allen et al. | |

* cited by examiner

LOCKER FOR MANAGING ACCESS TO DEVICES

CROSS-REFERENCE TO RELATED APPLICATIONS

This application claims the benefit of U.S. Provisional Application No. 63/413,320 filed Oct. 5, 2022, the entirety of which is incorporated by reference herein.

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described and claimed herein.

This patent disclosure contains material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

FIELD OF THE INVENTION

The present disclosure is directed to apparatuses and methods for charging, securing, tracking, and maintaining devices. More specifically, the present disclosure relates to apparatuses and methods to aid in efficient charging, securing, tracking, and maintaining devices, such as point of sale devices or mobile devices, without the need for direct, human oversight.

BACKGROUND OF THE INVENTION

Mobile devices and laptop computers are essential to the operation of nearly every business in today's society. Many businesses provide these devices to employees or contractors on a daily basis, requiring a complex system of charging, maintaining, tracking, and distributing these devices. The use of mobile devices or laptops in the workplace, while a current necessity, introduces a multitude of challenges including time-consuming manual check-in and check-out processes, lost productivity when devices aren't properly charged, and the cost of repairs and replacement when devices are lost or broken. These challenges can be particularly difficult in the fast-paced environment of warehouses, where devices are frequently exchanged and move with employees throughout facilities, making it difficult to track the location of certain devices and risking loss or destruction of the device when left unattended or when carelessly placed during device downtime.

Similarly, retail establishments and those in the service industry frequently utilize Mobile Point of Sale (mPOS) devices for customer convenience and the potential for increased revenue. This comes with additional responsibility to protect consumer data and comply with payment card industry (PCI) standards while also ensuring that mPOS devices are properly managed and easily accessible to sales reps or servers on the floor or on location. Briefly, a significant risk with mobile devices is associated with the inherent fact that these devices are easily moved from place to place. Namely, wireless connectivity permits a mPOS device to be taken to a location or area that is convenient for the customer to complete a transaction. However, since these devices often do not have a fixed location, they are susceptible to being stolen when left unattended by an employee or contractor. Similarly, the devices may be temporarily removed or modified to include malware or other harmful software designed to steal personal or financial information from customers. This poses substantial risks to retailers and business owners. As a result, updating and maintaining software and regularly reviewing and managing device health is essential to ensure that the devices are functioning appropriately and a free from malware.

Hence, businesses need a better way to keep devices charged, secure, tracked, and maintained.

SUMMARY OF THE INVENTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate manner.

In a first aspect, a device management cabinet is disclosed herein. In various embodiments, the device management cabinet comprises a single user interface section and one or more cabinet compartment sections. In embodiments, the location of the user interface section is modular with respect to the one or more cabinet compartment sections. The device management cabinet can further comprise a display, a means for authenticating a user, a processing system, or a combination thereof. In certain embodiments, the single user interface section comprises the display and the means for authenticating a user. Each compartment section can comprise a plurality of locker compartments configured to secure a device therein. In embodiments, each locker compartment comprises a door and a locking mechanism. The processing system and the display can be communicatively coupled with one another. In certain embodiments, the processing system is communicatively coupled with the locking mechanism of each locker compartment such that the processing system is configured to separately control the locking mechanism of each locker compartment.

In embodiments, the device management cabinet comprises one or more auxiliary cabinets. In certain embodiments, each of the one or more auxiliary cabinets does not comprise a user interface. At least one auxiliary cabinet can be communicatively coupled to the processing system. In embodiments, each of the one or more auxiliary cabinets comprises one or more auxiliary compartment sections, and each auxiliary compartment section comprises a plurality of auxiliary locker compartments.

Each auxiliary locker compartment can comprise a locking mechanism. The auxiliary locker compartments can be configured to secure a device therein.

In a second aspect, an apparatus for managing one or more apparatuses is disclosed. Embodiments comprise a device management system for managing access to a device, the device management system comprising a main device management cabinet, wherein the main device management cabinet comprises a single user interface section. In embodiments, the single user interface section comprises a user interface, and the user interface comprises a display. The main device cabinet can comprise one or more main cabinet compartment sections. In embodiments, the device management system further comprises one or more auxiliary cabinets. Each of the one or more auxiliary cabinets can comprise one or more auxiliary compartment sections. In certain embodiments, the main cabinet compartment section and each auxiliary compartment section comprises a plurality of locker compartments. In embodiments, each locker compartment comprises a locking mechanism, and each locker compartment is configured to secure the device therein. The main device management cabinet can comprise a processing system. The main device cabinet can comprise a display and a single controller. In embodiments, the processing system and the display are communicatively coupled with one another. The processing system can be communicatively coupled with the locking mechanism of each locker compartment such that the processing system is configured to control the locking mechanism.

In embodiments, the user interface comprises a means for authenticating a user. The means for authenticating a user can comprise an electronic card reader, a biometric identification device, a user input mechanism, or a combination thereof. In embodiments, the electronic card reader comprises a radio frequency identification reader. The user input mechanism can comprise a keypad, a keyboard, a touchscreen integrated within the display, or a combination thereof.

In embodiments, the locking mechanism comprises a latchbolt and a latch receiver. The latchbolt can be disposed on a door of each locker compartment, and the latchbolt can be configured to be reversibly secured within a recess of the latch receiver. In embodiments, the door is configured to open vertically in the downward direction when the latchbolt is released from the recess of the latch receiver.

In certain embodiments, the at least one auxiliary cabinet is communicatively coupled to the processing system via a data cable. Each of the auxiliary cabinets can comprise an auxiliary cabinet PCB, and the auxiliary cabinet PCB can be communicatively coupled to the processing system. Embodiments can comprise at least two auxiliary cabinets, wherein a first auxiliary cabinet is communicatively coupled directly to the processing system, and a second auxiliary cabinet is communicatively coupled directly to the first auxiliary cabinet.

In embodiments, each main cabinet compartment section comprises at least five locker compartments. Each auxiliary compartment section can comprise at least five locker compartments.

Another aspect of the present disclosure includes a method of managing access to a device secured within any of the various device management systems disclosed herein. Embodiments can comprise authenticating a user, selecting a locker compartment, and unlocking the selected locker compartment. In embodiments, the step of authenticating a user comprises transmitting an authentication signal to the processing system and confirming, via the processing system, that the authentication signal is associated with an authorized user. In embodiments, the main device management cabinet comprises a transistor and a solenoid, and the step of unlocking the selected locker compartment comprises instructing, via the processing system, the transistor to generate an unlocking electric current. The method can further comprise generating, via the transistor, the unlocking electric current; permitting the unlocking current to travel to the solenoid via a locker cable; activating the solenoid via the electric current, wherein activation of the solenoid releases the latch receiver within the selected locker; releasing the latchbolt; and permitting the door of the selected locker to be opened.

In another aspect, the present disclosure relates to a method of retrieving a device from any of the various device management systems disclosed herein. In embodiments wherein the user interface comprises a means for authenticating a user, the method comprises interacting with the means for authenticating a user to authenticate the user's rights to access the device. If the user is authenticated, the method comprises permitting the device management system to unlock at least one locker compartment and retrieving the device from the unlocked compartment. In certain embodiments, the means for authenticating a user comprises an electronic card reader, and the step of interacting with the means for authenticating the user comprises holding an RFID card adjacent to the electronic card reader. In embodiments wherein the display comprises a touchscreen, the method can further comprise reviewing the display following authentication of the user and selecting, via the touchscreen, a device from a selected locker compartment.

In an additional aspect, the present disclosure includes a method of securing a device within any of the various device management systems disclosed herein. In embodiments, the method comprises authenticating a user; selecting a locker compartment; unlocking the selected locker compartment; plugging the device into a device data cable within the selected locker compartment; placing the device into the selected locker compartment; and closing the door of the selected locker compartment such that the device is locked within the selected locker compartment.

Other objects and advantages of this invention will become readily apparent from the ensuing description.

BRIEF DESCRIPTION OF THE FIGURES

Certain illustrations, charts, or flow charts are provided to allow for a better understanding of the present invention. It is to be noted, however, that the drawings illustrate only selected embodiments and are therefore not to be considered limiting of scope. Additional and equally effective embodiments and applications of the present invention exist.

DETAILED DESCRIPTION OF THE INVENTION

Abbreviations and Definitions

Figure 1A:
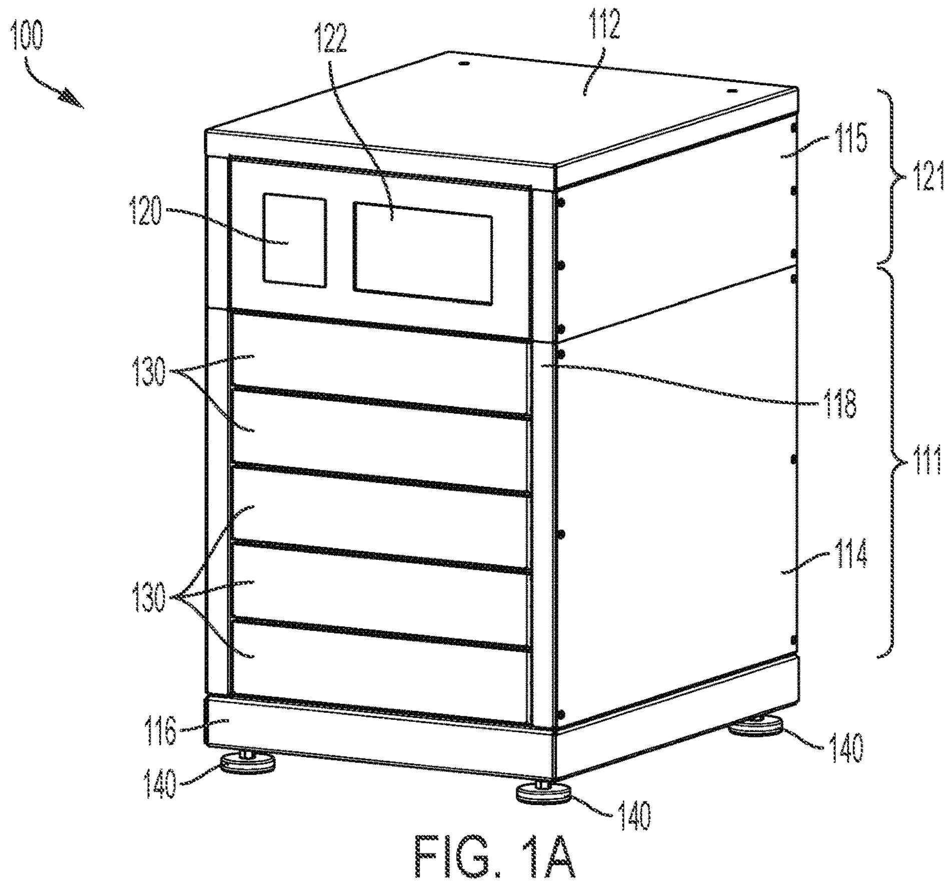
FIG. 1A shows a front perspective view of a five-compartment device management cabinet under one embodiment.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate manner.

The singular forms "a", "an" and "the" include plural reference unless the context clearly dictates otherwise. The use of the word "a" or "an" when used in conjunction with the term "comprising" in the claims and/or the specification may mean "one," but it is also consistent with the meaning of "one or more," "at least one," and "one or more than one."

Wherever any of the phrases "for example," "such as," "including" and the like are used herein, the phrase "and without limitation" is understood to follow unless explicitly stated otherwise. Similarly, "an example," "exemplary" and the like are understood to be nonlimiting.

The term "substantially" allows for deviations from the descriptor that do not negatively impact the intended purpose. Descriptive terms are understood to be modified by the term "substantially" even if the word "substantially" is not explicitly recited. Therefore, for example, the phrase "wherein the lever extends vertically" means "wherein the lever extends substantially vertically" so long as a precise vertical arrangement is not necessary for the lever to perform its function.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b, and c. Wherever the terms "a" or "an" are used, "one or more" is understood, unless such interpretation is nonsensical in context. When the word "or" is used in reference to a list of two or more items, that word covers all of the following interpretations of the word: any of the items in the list, all of the items in the list and any combination of the items in the list. Words using the singular or plural number also include the plural or singular number respectively. Additionally, the words "herein," "hereunder," "above," "below," and words of similar import, when used in this application, refer to this application as a whole and not to any particular portions of this application.

As used herein the term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower)

For purposes of the present disclosure, it is noted that spatially relative terms, such as "up," "down," "right," "left," "beneath," "below," "lower," "above," "upper" and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below," or "beneath" other elements or features would then be oriented "above" the other elements or features. Thus, the exemplary term "below" can encompass both an orientation of above and below. The device can be otherwise oriented (rotated 90 degrees or at other orientations) and the spatially relative descriptors used herein interpreted accordingly.

As used herein, the term "device" can refer to any device or asset that can be readily moved from one location to another. "Device" can refer to electronic or non-electronic devices. In certain embodiments, the word "device" can refer to a mobile device. In embodiments, a device includes a laptop computer or a hand-held electronic device. Non-limiting examples of devices include smart phones, tablets, or personal digital assistances, smart watches, laptops, label makers, barcode scanners, smart terminals used with mPOS systems, tablets, and other portable electronic devices that are useful or convenient to utilize in a business setting.

"Device," as used herein can refer lights, radios, lamps, or other portable electronic and non-electronic devices. In embodiments, a device comprises any article, whether electronic or not, that can be stored within any of the various locker compartments disclosed herein.

The terms "communicatively linked," "communicatively coupled," and the like can be used interchangeably in reference to any form of connection or communication path that couples any of the various components described herein and includes any medium for communicating or transferring files among the components. Exemplary communication paths include wireless connections, wired connections, and hybrid wireless/wired connections. Communication paths can include couplings or connections to networks including local area networks (LANs), metropolitan area networks (MANs), wide area networks (WANs), proprietary networks, interoffice or backend networks, and the Internet. Further examples of communication paths include removable fixed mediums. Such removable fixed mediums can comprise floppy disks, hard disk drives, CD-ROM disks, digital video (DVD) discs, and Blu-ray™ disks, flash RAM, or any combination thereof. Suitable communication paths for communicatively linked components can comprise Universal Serial Bus (USB) connections, RS-232 connections, telephone lines, coaxial cables, fiber optic cables, radio waves, buses, and electronic mail messages. In various embodiments, devices or components can be communicatively linked via wireless communications protocols. Components or devices can be communicatively coupled via a wireless local area network (WLAN). A WLAN connection may implement Wi-Fi™ communications protocols. Alternatively, the communicative coupling may comprise a wireless personal area network WPAN. A WPAN connection may implement Bluetooth™ communications protocols. Certain components may be communicatively coupled through a local router. The router can comprise a component of the WLAN or WPAN. The router may further communicate with WANs, MANs, and/or other private/public networks and communication services providing general internet connectivity.

Any of the various components or devices disclosed herein can comprise a data port for relaying data to and from other components or devices. Exemplary data ports include, but are not limited to a USB connection, and HDMI connection, an ethernet connection, or any other type of data port. In embodiments, the data port allows for a wired communication between the various components and devices disclosed herein. The data port can be used alone or in combination with wireless communications paths as disclosed herein.

As used herein, the term "routine use" refers to any use of a given device that falls within the device's intended business purpose. By way of non-limiting example, the routine use of a device includes use as a mPOS device to complete a commercial transaction, use for scanning or tracking inventory or products, use for communicating with clients or customers, use for scheduling appointments, use to showcase given products or services to clients or customers, use for providing quotations for a business's products or services, use for generating or assigning tasks, use for remote work, use for marketing purposes or managing social media, or any combination thereof. The foregoing list is not intended to be limiting, as additional routine uses are envisioned and are known in the art.

DESCRIPTION OF SELECTED EMBODIMENTS

Disclosed herein are apparatuses, systems, and methods for effectively charging, securing, tracking, or maintaining one or more devices. In embodiments, the apparatuses, systems, and methods disclosed herein comprise a hybrid hardware and software solution that provides control over remote and physical access to devices. The apparatuses, systems, and methods disclosed herein can permit quick and efficient distribution and return of devices without human oversight. Further embodiments permit tracking or auditing of device usage, remote access to the operating systems or other software on devices (such as to permit device troubleshooting, ensure compliance with regulatory standards, or installation of required software updates), or a combination thereof. In certain embodiments, the disclosure relates to a device management cabinet comprising a plurality of individual locker compartments to permit controlled remote or physical access to devices that can be secured therein.

FIG. 1A shows a front perspective view of a device management cabinet 100 under one embodiment. In this embodiment, the device management cabinet 100 comprises a compartment section 111, that comprises one or more locker compartments 130 and a user interface section 121 that comprises a user interface. The device management cabinet 100 can comprise a top surface 112, two sidewall panels 114, a front surface 118, and a back surface (seen at 111 of FIG. 6C). In embodiments, each sidewall panel 114 is disposed on a side of the cabinet 100 that is opposite the other sidewall panel 114. The device management cabinet 100 can further comprise a base 116. As can be seen, the device management cabinet 100 of FIG. 1A comprises five individual locker compartments 130 that can each be selectively opened or closed. In embodiments, each locker compartment 130 can be selectively opened or closed by a user or a processing system (seen at 450 in FIG. 6G) executing commands received from a user. The front surface 118 of the cabinet 100 can comprise a user interface. In embodiments, the user interface comprises a means for authenticating a user 120, a display 122, or a combination thereof. In certain embodiments, the display 122 further comprises a touchscreen.

In embodiments, the means for authenticating a user 120 serves as a gatekeeper for controlling access to or unlocking one or more locker compartments 130. By way of non-limiting example, the means for authenticating a user 120 can permit access to the display 122 (including access to a touchscreen in embodiments wherein the display 122 includes a touchscreen), access to one or more locker compartments 130, or both. As shown in the FIG. 1 embodiment, the means for authenticating a user 120 can comprise an electronic card reader, such as a radio frequency identification card (RFID) card reader. However, as further discussed herein, the means for authenticating a user 120 can comprise any mechanism used to identify appropriate individuals who are authorized to access restricted systems or lockers. The means for authenticating a user 120 can comprise a user input mechanism. Such a user input mechanism can include a means for entering a passcode or scanning a unique identifier (such as a one-time bar code, a one-time passcode, or the like). In embodiments, the means for entering the passcode comprises a touch screen or a keyboard. In certain embodiments, the touch screen is integrated into the display 122. In one, non-limiting embodiment, the means for authenticating a user 120 comprises an RFID card reader, and the device management cabinet 100 is configured such that, when an RFID card belonging to an authorized user is proximal to the RFID card reader, the RFID card reader obtains authentication data from the user's RFID card. The RFID card reader then provides the authentication data to the processor 450, which authenticates the user and permits the authenticated user to access the touchscreen on the display 122, such as by unlocking the display or otherwise granting access to the display screen 122 to permit the user to interact therewith.

Figure 1B:
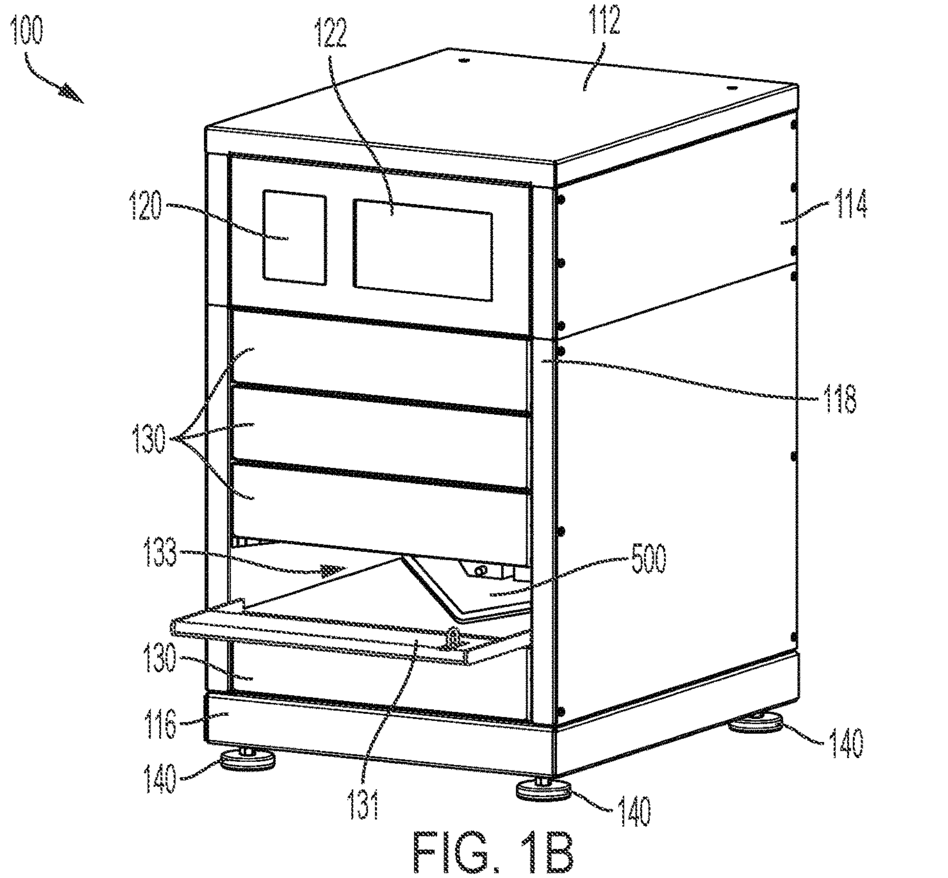
FIG. 1B shows a front perspective view of a five-compartment device management cabinet with an open compartment under one embodiment of the present disclosure. A device can be seen charging within the interior space of the locker compartment.

FIG. 1B shows a front perspective view of a device management cabinet 100 with an open locker compartment 130 under one embodiment of the present disclosure. As can be seen, one or more locker compartments 130 can comprise an open space 133 that is sufficient to hold a device 500 therein. In the FIG. 1B embodiment, each locker compartment 130 comprises a door 131 that can be configured to be selectively opened by a user. In this embodiment, the door 131 is configured to be opened and closed. A mobile device 500 can be seen charging within the interior space of the locker compartment.

Although FIGS. 1A and 1B show the user interface section 121 disposed at the top of the device management cabinet 100, embodiments disclosed herein are not so limited. The user interface section 121 can be disposed at any location of the device management cabinet 100. In certain embodiments, the user interface section 121 is disposed below the compartment section 111. The user interface section 121 can be disposed between one or more locker compartments 130. Certain embodiments can comprise a plurality of compartment sections 111, and the user interface section 121 can be disposed above, below, adjacent to, or between any of the one the plurality of compartment sections 111. In one embodiment, the device management cabinet is modular such that the user interface section 121 can be positioned with respect to one or more compartment sections 111 or locker compartments 130 according to the requirements or preferences of a user. In such modular embodiments, the user interface section 121 and the plurality of compartment sections 111 can be configured to be reversibly secured in a desired position such that a user may temporarily elect a first modular configuration, and then elect a second modular configuration, wherein the second modular configuration is not the same as the first modular configuration. By way of non-limiting example, the user interface section 121 in the first modular configuration can be in an alternate location with respect to at least one of the plurality of compartment sections 111 as compared to the second modular configuration, the number of compartment sections 111 in the first modular configuration can be different from the number of compartment sections 111 in the second modular configuration, the number of locker compartments 130 can be different between the first and second modular configurations, or a combination thereof. Embodiments can comprise any number of different modular configurations. Certain embodiments comprise up to 1,000 modular configurations. The device management cabinets disclosed herein can comprise up to 100 modular configurations. In embodiments, the device management cabinet comprises up to 90 modular configurations, up to 80 modular configurations, up to 70 modular configurations, up to 60 modular configurations, up to 50 modular configurations, up to 40 modular configurations, up to 30 modular configurations, up to 20 modular configurations, or up to 10 modular configurations. Embodiments can comprise two or more modular configurations. Certain embodiments comprise at least five modular configurations. The device management cabinet 100 can comprise one, two, three, four, five, six, seven, eight, nine, or ten modular configurations. In embodiments, the number of configurations is directly proportional to the number of locker compartments, 130, the number of compartment sections 111, or a combination thereof.

Figure 2A:
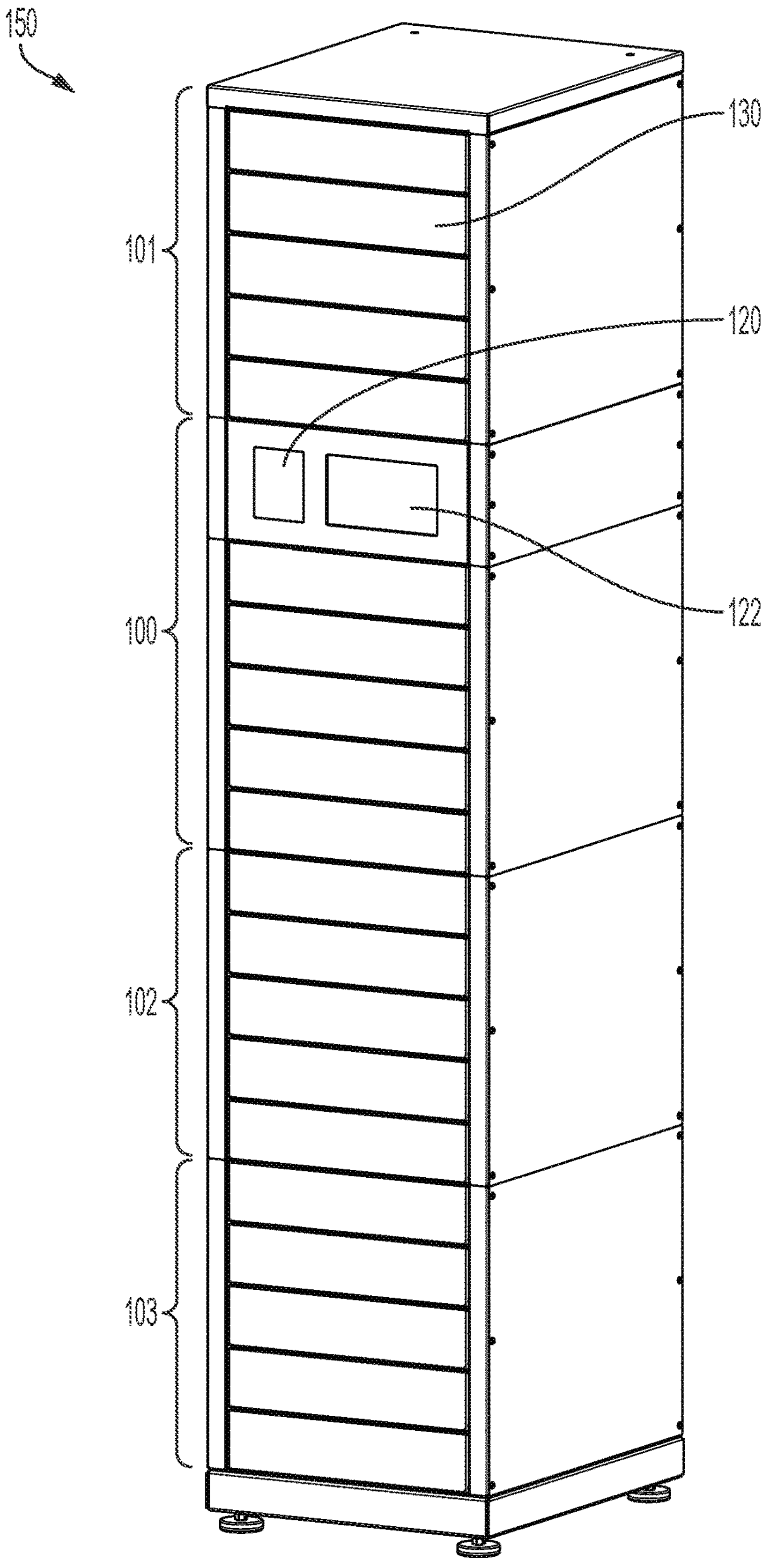
FIG. 2A shows a front perspective view of a device management system under an embodiment with twenty compartments that are vertically arranged.
Figure 2B:
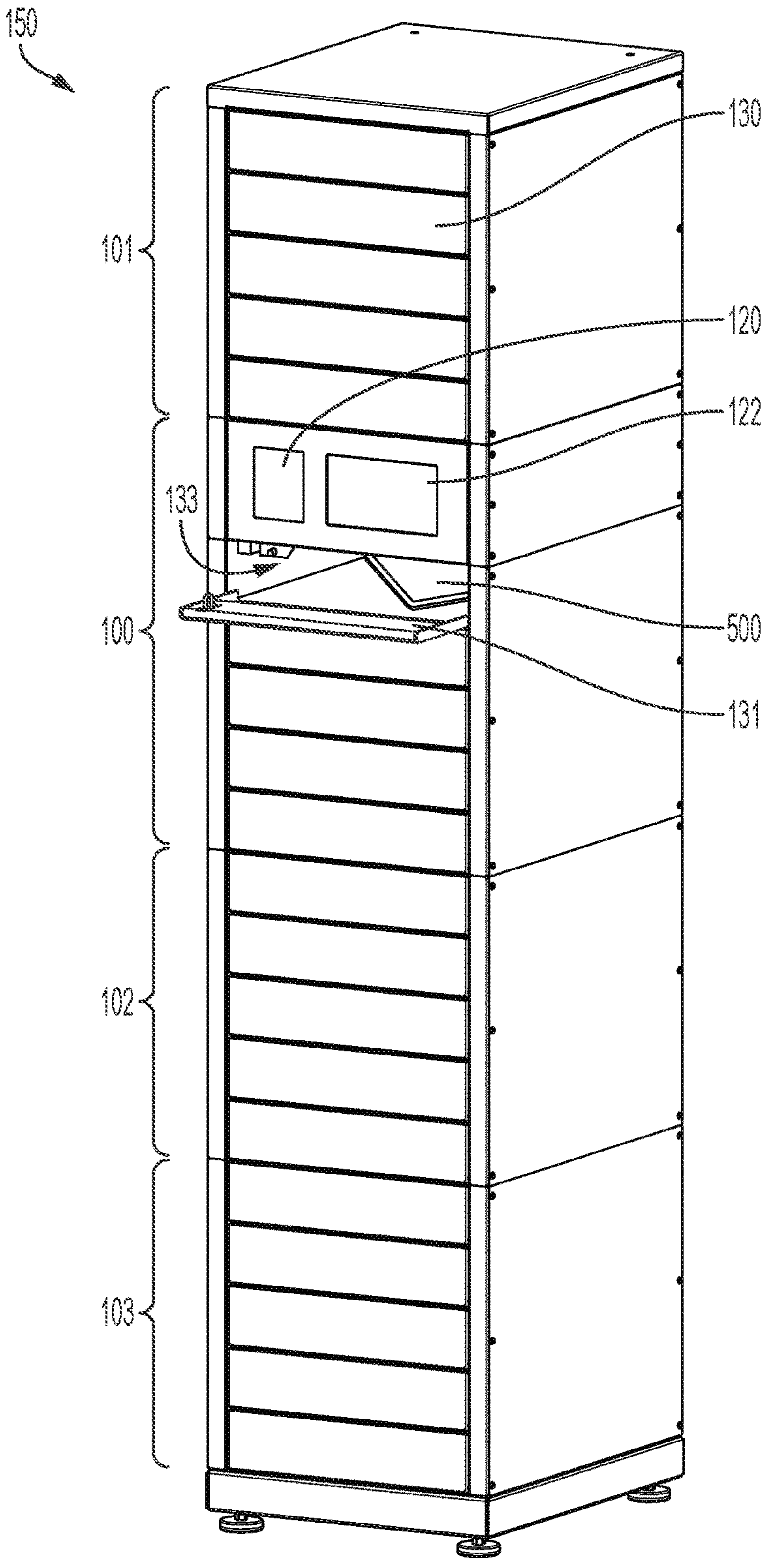
FIG. 2B provides a front perspective view of a twenty-compartment, vertically arranged device management system with an open compartment under an exemplary embodiment. A device can be seen charging within the interior space of the locker compartment.

FIG. 2A shows a front perspective view of a device management system 150 under an embodiment with vertically arranged locker compartments 130, and FIG. 2B provides a front perspective view of the device management system 150 of FIG. 2B with an open compartment 133. A mobile device can be seen charging within the interior space of the locker compartment.

The device management system 150 can comprise two or more vertically stacked cabinets 100, 101, 102, 103. In the FIG. 2A embodiment, the device management system 150 comprises four vertically arranged cabinets 100, 101, 102, 103, wherein each cabinet 100, 101, 102, 103, includes five locker compartments 130. Thus, in FIG. 2A, the device management system 150 comprises twenty locker compartments 130. As shown, the device management system 150 of FIG. 2A comprises the device management cabinet 100 of FIG. 1A and three auxiliary cabinets 101, 102, 103.

Figure 2C:
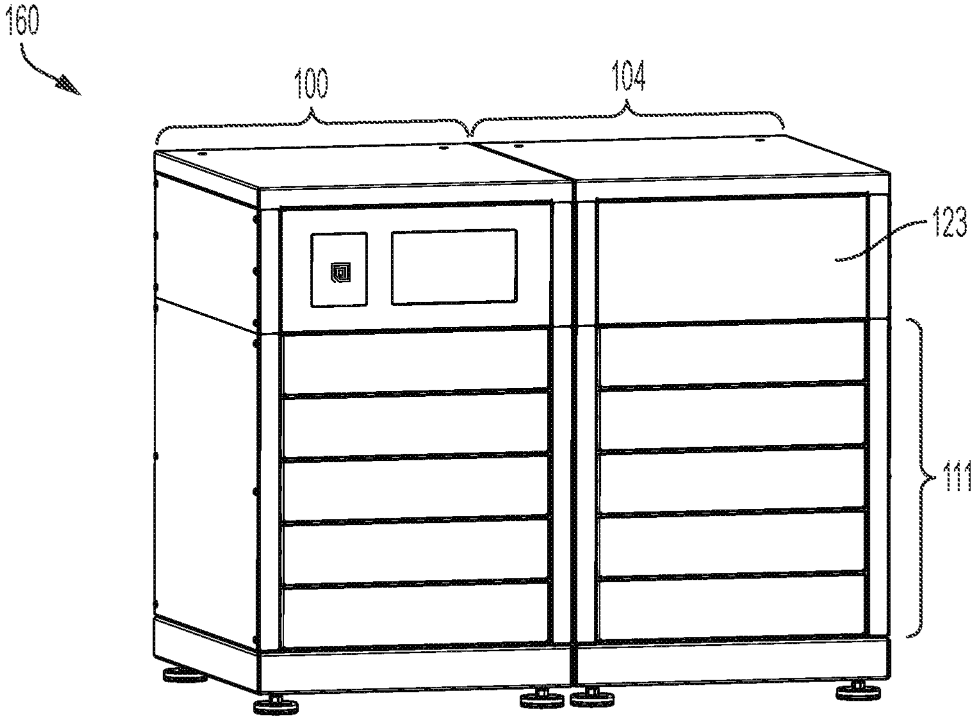
FIG. 2C shows a front perspective view of a ten-compartment device management system under an embodiment comprising two five-compartment cabinets.

FIG. 2C provides a front perspective view of a device management system 160 under an embodiment with two horizontally arranged cabinets 100, 104. In this embodiment, the device management system comprises two cabinets 100, 104 that each comprise five locker compartments such that the entire device management system 160 comprises ten separate locker compartments.

Figure 2D:
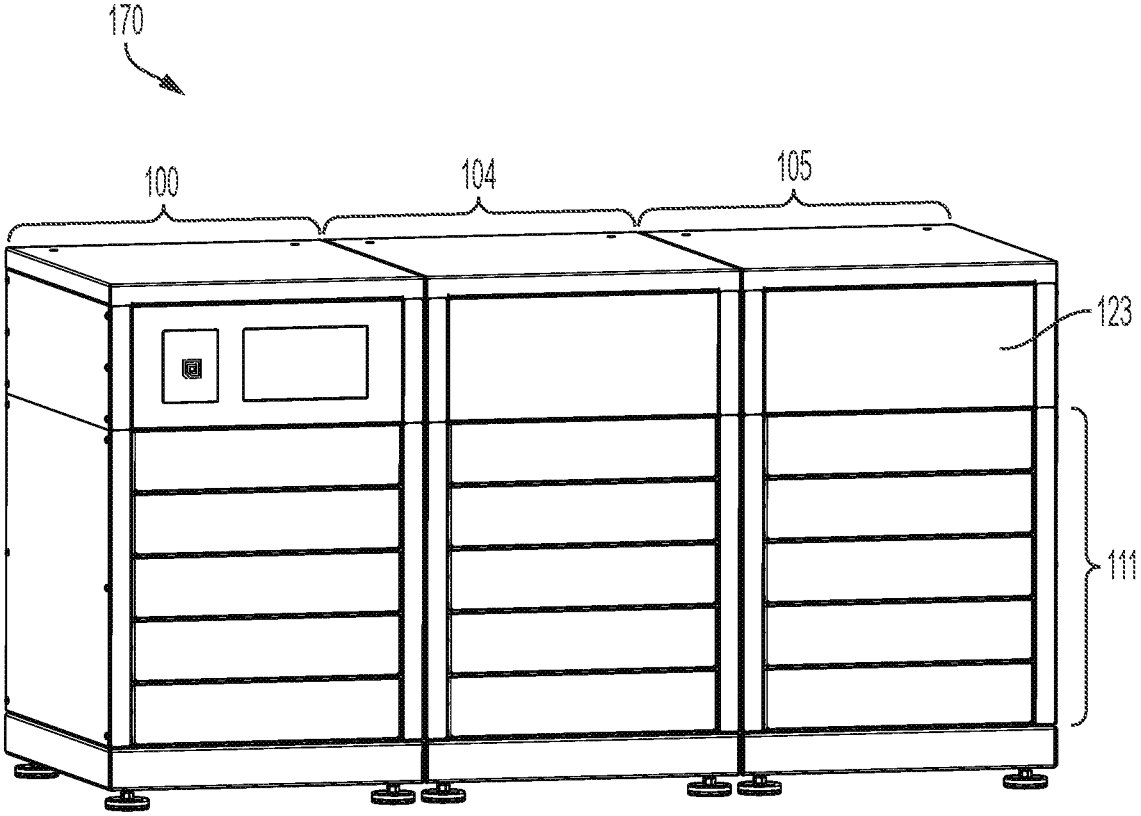
FIG. 2D shows a front perspective view of three five-compartment charging cabinets that are horizontally arranged to form a fifteen-compartment device management system under an embodiment.

FIG. 2D provides a front perspective view of a device management system 170 under an embodiment with three horizontally arranged cabinets 100, 104, 105. In this embodiment, the device management system comprises three cabinets 100, 104, 105 that each comprise five locker compartments such that the entire device management system 170 comprises fifteen separate locker compartments.

Figure 3A:
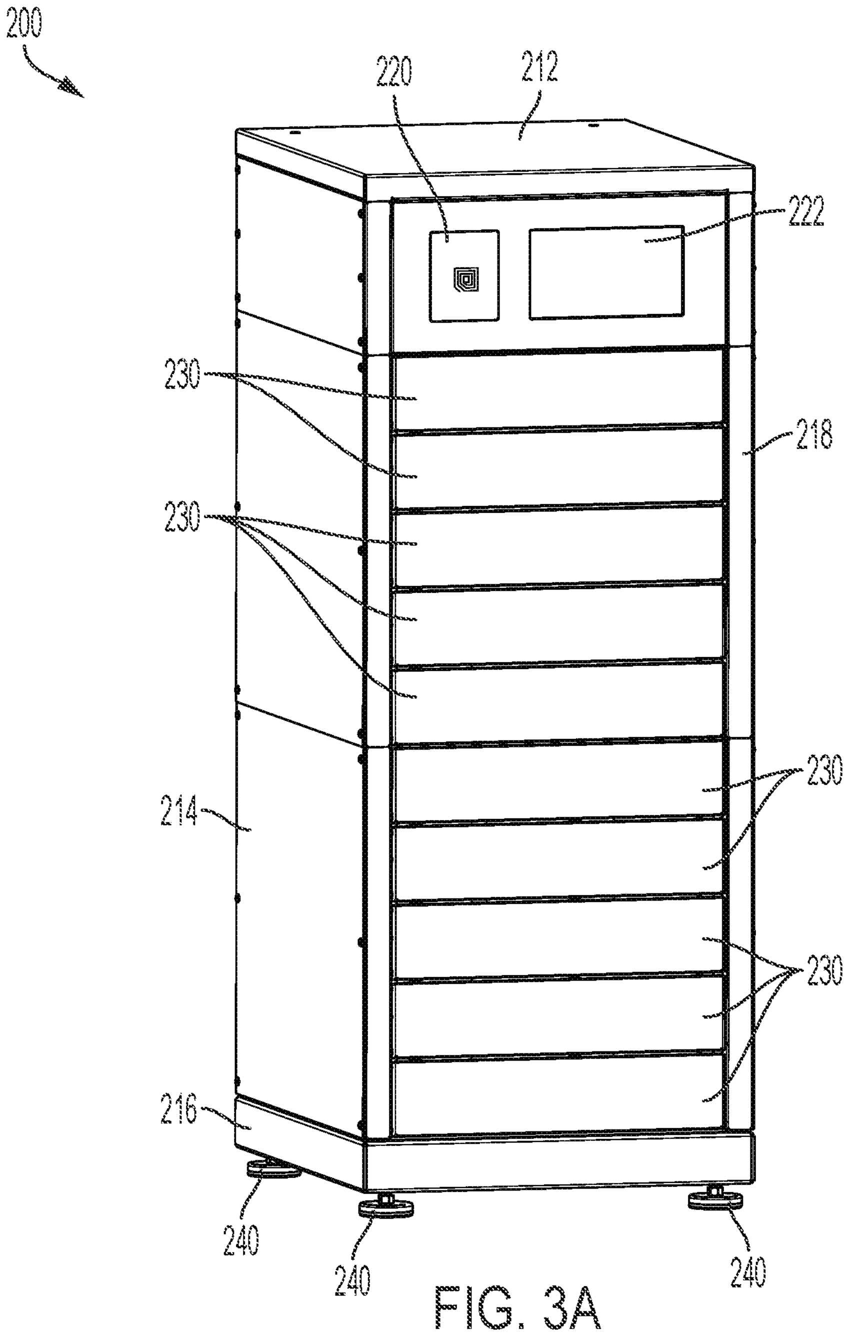
FIG. 3A provides a front perspective view of a device management cabinet under an embodiment with ten compartments that are vertically arranged.

FIG. 3A provides a front perspective view of a device management cabinet 200 under another embodiment. The device management cabinet 200 can comprise a top surface 212, two sidewall panels 214, a front surface 218, and a back surface. In embodiments, each sidewall panel 214 is disposed on a side of the cabinet 200 that is opposite the other sidewall panel 214. The device management cabinet 200 can further comprise a base 216. As can be seen, the device management cabinet 200 of FIG. 3A comprises ten individual locker compartments 230 that can each be selectively opened or closed. In embodiments, each locker compartment 230 can be selectively opened or closed by a user or a processing system (seen at 450 in FIG. 6G) executing commands received from a user. The front surface 218 of the cabinet 200 can comprise a user interface. The user interface can comprise a means for authenticating a user 220, a display 222, or a combination thereof. In certain embodiments, the display 222 further comprises a touchscreen.

Figure 3B:
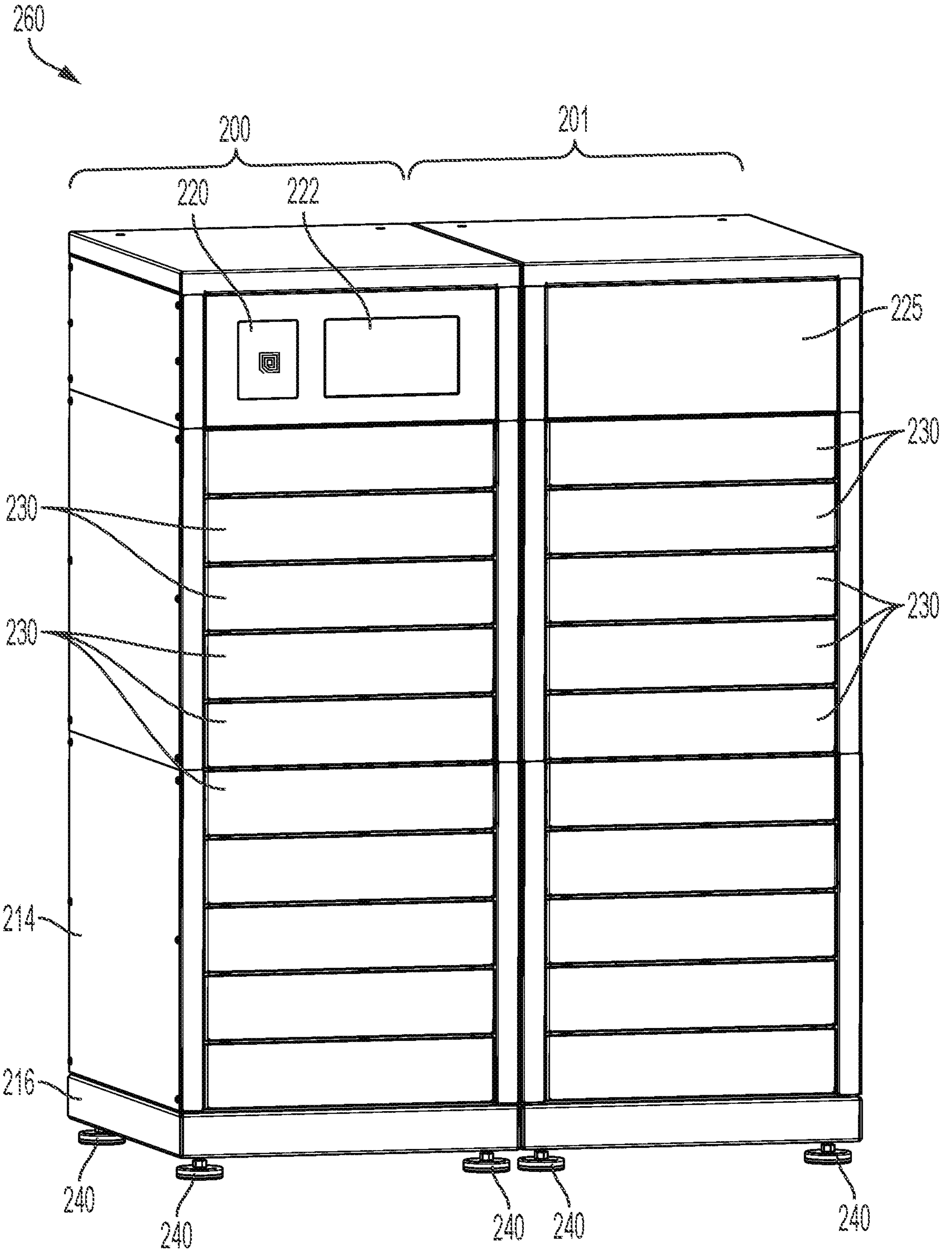
FIG. 3B shows a front perspective view of the two ten-compartment charging cabinets that are horizontally arranged to form a twenty-compartment device management system under one embodiment of the present disclosure.

FIG. 3B provides a front perspective view of a device management system 260 under an embodiment with two horizontally arranged cabinets 200, 201. In this embodiment, the device management system 260 comprises two cabinets 200, 201 that each comprise ten locker compartments 230 such that the entire device management system 260 comprises twenty separate locker compartments. As shown, the device management system 260 of FIG. 3B comprises the device management cabinet 200 of FIG. 3A and an auxiliary cabinet 201.

As shown in FIGS. 1A and 3A, the various device management cabinet and systems disclosed herein can comprise a single main device management cabinet 100, 200 that includes a single means for authenticating a user 120, 220 a single display 122, 222, or a combination thereof. In various embodiments, the display 122, 222 further comprises a touchscreen. In embodiments, such as those shown in FIGS. 2A-2D and 3B, device management systems 150, 160, 170,

260 can comprise a single device management cabinet 100, 200 and at least one auxiliary cabinet 101, 102, 103, 104, 105, 201.

Some device management systems 150, 260 comprise modular embodiments such that a user can select a desired number of locker compartments 130, 230, a desired number of device management cabinets 100, 101, 102, 103, 104, 105, 200, 201, a desired configuration of device management cabinets 100, 101, 102, 103, 104, 105, 200, 201, or a combination thereof. In embodiments, the main device management cabinet 100, 200 comprises a compartment section 111 that includes one or more locker compartments 130, 230, a user interface section 121 that includes the user interface 120, 122, 220, 222 and a base 116, 216. The at least one auxiliary cabinet 101, 102, 103, 104, 105, 201 can comprise a compartment section 111 and a base section 116 but does not comprise a user interface section 121.

Each compartment section 111 can be attached to one or more additional compartment sections 111, the user interface section 121, the base 116, or a combination thereof. For instance, each main device cabinet 100, 200 can be vertically oriented such that the main device cabinet 100, 200 comprises the base 116, 216 at the lowest portion, the user interface section 121 at the highest portion, and one or more compartment sections 111 therebetween. Alternatively, the user interface section 121 can be disposed between two compartment sections 111 (as shown in FIGS. 2A and 2B). Each auxiliary cabinet 101, 102, 103, 104, 105, 201 can be vertically oriented such that the base 116 is disposed at the lowest portion with at least one compartment section 111 stacked thereon. In certain embodiments, the top portion of an auxiliary cabinet 101, 102, 103, 104, 105, 201 comprises an upper panel 123 that is devoid of a display 120 or a means of authenticating a user 120 (see FIGS. 2C and 2D). In such embodiments, the upper panel 123 of the auxiliary cabinet 101, 102, 103, 104, 105, 201 can be configured to ensure that the top surface of the auxiliary cabinet 101, 102, 103, 104, 105, 201 is substantially flush with the top surface 112, 212 of the main device management cabinet 100, 200.

One or more compartment sections 111, the user interface section 121, the base 116,216, or a combination thereof can be secured together via a mechanical fastener. In embodiments, the mechanical fastener comprises a screw, a tab, a bolt, a rivet, a nail, a nut, a key, an anchor, a stud, a ring, a pin, or any other fastener commonly used to secure panels. In certain embodiments, one or more compartment sections 111, the user interface section 121, the base 116, 216, or a combination thereof are integral with one another or otherwise irreversibly jointed together.

In embodiments, the number of compartment sections 111, the configuration of the compartments, or both can be selected according to a user's preference. For instance, the main device management cabinet 100, 200, at least one auxiliary cabinet 101, 102, 103, 104, 105, 201, or both can comprise a plurality of compartment sections 111. Each cabinet can comprise up to ten compartment sections 111. In embodiments, each cabinet can comprise one, two, three, four, five, six, seven, eight, nine, or ten compartment sections 111. Each compartment section 111 can comprise a plurality of locker compartments 130, 230. In embodiments, each compartment section comprises up to twenty locker compartments 130, 230. Each compartment section 111 can comprise up to ten locker compartments 130, 230. Each compartment section 111 can comprise one, two, three, four, five, six, seven, eight, nine, or ten locker compartments 130, 230.

In embodiments, the main device management cabinet 100, 200 and one or more auxiliary cabinets 101, 102, 103, 104, 105, 201 can be secured together via a mechanical fastener. In embodiments, the mechanical fastener comprises a screw, a tab, a bolt, a rivet, a nail, a nut, a key, an anchor, a stud, a ring, a pin, or any other fastener commonly used to secure the cabinets together. In certain embodiments, the main device management cabinet 100, 200 and one or more auxiliary cabinets 101, 102, 103, 104, 105, 201 are integral with one another or otherwise irreversibly jointed together such that the main device management cabinet 100, 200 and at least one auxiliary cabinet 101, 102, 103, 104, 105, 201 comprises a single unit.

Although each cabinet represented by the provided exemplary drawings comprises either five or ten locker compartments 130, 230, the embodiments disclosed herein are not so limited. For instance, certain embodiments can comprise one or more cabinets with up to 100 locker compartments. In embodiments, the device management cabinet comprises up to 50 locker compartments. Each device management cabinet can comprise up to 5, 10, 15, 20, 25, 30, 35, 40, 45, or 50 locker compartments. Certain embodiment can comprise as little as one locker compartment. Embodiments comprise 1, 2, 3, 4, 5, 6, 7, 8, 9, 10, 11, 12, 13, 14, 15, 16, 17, 18, 19, 20, 21, 22, 23, 24, or 25 locker compartments per device management cabinet.

Similarly, each locker compartment 130, 230 can comprise any shape that is suitable for use as a locker. For instance, any one or more of the locker compartments can have a shape that is substantially square, substantially rectangular, substantially triangular, or substantially circular. In embodiments, the shape of one or more lockers can be a pentagon, a hexagon, a heptagon, an octagon, a nonagon, a decagon, or an oval. In embodiments that comprise a plurality of locker compartments, each locker compartment can comprise a shape that is substantially similar to that of the at least one other locker compartment. In certain embodiments, at least one locker compartment comprises a shape that is different from at least one other locker compartment.

In embodiments, each of the locker compartments 130, 230 is controlled via a single user interface 120, 122, 220, 222. A single user interface 120, 122, 220, 222 can be used to control each locker compartment 130, 230 across the two or more cabinets 100, 101, 102, 103, 104, 105, 200, 201. The device management system 150, 260 can comprise a first printed circuit board (PCB) (seen at 400 in FIG. 6F), a display PCB (seen at 600 of FIG. 6E), or a combination thereof. In embodiments, the display PCB (seen at 600 of FIG. 6E) is integrated with the or otherwise mounted to the display 122. In certain embodiments, the device management system 150, 260 includes only two PCBs and single controller such that the plurality of locker compartments 130, 230 and the user interface 120, 122, 220, 222 share a single controller. In certain embodiments, each auxiliary cabinet 101, 102, 103, 104, 105, 201 comprises a PCB configured for use with electronic devices disposed within the locker compartments 130, 230 of each auxiliary cabinet 101, 102, 103, 104, 105, 201 or for use in operating the locking mechanism (seen at 140 FIG. 8) of each locker compartment 130, 230 of the auxiliary cabinets 101, 102, 103, 104, 105, 201. Alternatively, in certain embodiments, at least one auxiliary cabinet 101, 102, 103, 104, 105, 201 does not include a PCB. In such embodiments, the main PCB 400 can be configured for use with electronic devices disposed within the locker compartments 130, 230 of at least one auxiliary cabinet 101, 102, 103, 104, 105, 201 or for use in operating the locking mechanism of each locker compartment 130, 230 of at least one auxiliary cabinet 101, 102, 103, 104, 105 201. Embodiments wherein at least one auxiliary cabinet one auxiliary cabinet 101, 102, 103, 104, 105, 201 utilizes the main PCB 400 can be particularly useful when the auxiliary cabinet 101, 102, 103, 104, 105, 201 comprises less than five locker compartments. Such embodiments can be useful when the auxiliary cabinet 101, 102, 103, 104, 105, 201 comprises a single locker compartment.

In embodiments, the means for authenticating a user 120, 220 serves as a gatekeeper for access to or unlocking one or more locker compartments 130, 230. By way of non-limiting example, the means for authenticating a user 120, 220 can permit access to the display 122, access to one or more locker compartments, or a combination thereof. In embodiments, the means for authenticating a user 120, 220 comprises any mechanism used to identify appropriate individuals who are authorized to access restricted systems or lockers. In embodiments, the means for authenticating a user 120, 220 comprises an electronic card reader, a user input mechanism, or a combination thereof. In certain embodiments, the electronic card reader comprises an RFID reader. The user input mechanism can comprise means for entering a passcode or scanning a unique identifier (such as a one-time bar code, a one-time passcode, or the like). In embodiments, the means for entering the passcode comprises a touch screen. In certain embodiments, the touch screen is integrated into the display 122, 222. The means for entering a passcode can comprise a keyboard, a numerical or alphabetical keypad, or a combination thereof. In certain embodiments, the means for authenticating a user 120, 220 comprises a biometric identifier. Non-limiting examples of suitable biometric identifiers include a facial scanner, a fingerprint reader, a retinal scanner, or any other means known in the art to distinguish biological identifiers that are unique to a particular individual.

As shown in FIGS. 1A, 1B, 3A, 3B, and 6C in various embodiments, support stands 140, 240 can extend from the underside of the base 116, 216. In embodiments, the support stands 140, 240 comprise a proximal end that is adjacent to the device management cabinet and a distal end that is adjacent to the floor. A disc is shown at the distal end of the support stand 140, 240, and a threaded rod can extend upward from the disc to form a foot or leg that supports the device management cabinet. In various embodiments, the support stands 140, 240 comprise a scratch-resistant material, a slip-resistant material, or a combination thereof disposed on the underside of the disc. The scratch-resistant material is configured to prevent scratching, scuffing, marking, wearing down, or otherwise damaging the surface on which the device management cabinet 100, 200 rests gravitationally. The slip-resistant material can be configured to prevent unintentional movement of the cabinet 100, 200 during use. The scratch-resistant material or a slip-resistant material can comprise synthetic, semi-synthetic, or natural materials including elastomers, leather, fabric, plastic, a combination thereof, or any other scratch resistant material or combination of materials known or later developed. In embodiments, the scratch-resistant material comprises felt. The scratch-resistant material or slip-resistant material can comprise rubber, plastic, silicon, or a combination thereof.

In various embodiments, the height of the support stands 140, 240 can be adjustable or non-adjustable. The support stands 140, 240 can comprise elevator bolts. In such embodiments, the base 116, 216 of the cabinet 100, 200 can comprise a receiving member that comprises threads that are complimentary to those of the threaded rod. The complementary threads of the receiving member are configured to releas ably receive and engage the threaded rod from the proximal end. Thus, in various embodiments, the height of at least one support stand 140, 240 can be adjusted by turning the support stand 140, 240 clockwise or counter-clockwise, which serves to raise or lower the support stands 140, 240 within the receiving member. Certain embodiments can further comprise a locking nut that is disposed along the threaded rod between the disc and the base of the cabinet 100, 200. In such embodiments, the locking nut can comprise threads that are complementary to those of the threaded rod, and, after the desired height of the support stand is achieved, the locking nut can be tightened toward the top of the threaded rod such that the locking nut meets with the base 116, 216 to prevent unintentional rotation of the threaded rod and ensure that the support stand remains at the desired height. The cabinet 100, 200 can comprise a plurality of support stands 140, 240. Embodiments of the cabinet 100, 200 can comprise any number of support stands 140, 240. For example, the cabinet 100, 200 can comprise up to 10 support stands. The support stands 140, 240 can be permanently affixed to the undersurface of the cabinet 100, 200 or can be removable. Under alternate embodiments, no support stands are used, and the base 116, 216 of the cabinet 100, 200 is configured to rest gravitationally upon a support surface such as a table, a floor, the ground, or any other surface capable of supporting the cabinet 100, 200. In embodiments without support stands, the undersurface of the cabinet 100, 200 can be coated or lined with a scratch-resistant material, a slip-resistant material, or a combination thereof. In one embodiment, the support stands are disposed on each corner of the base 116, 216.

Figure 4A:
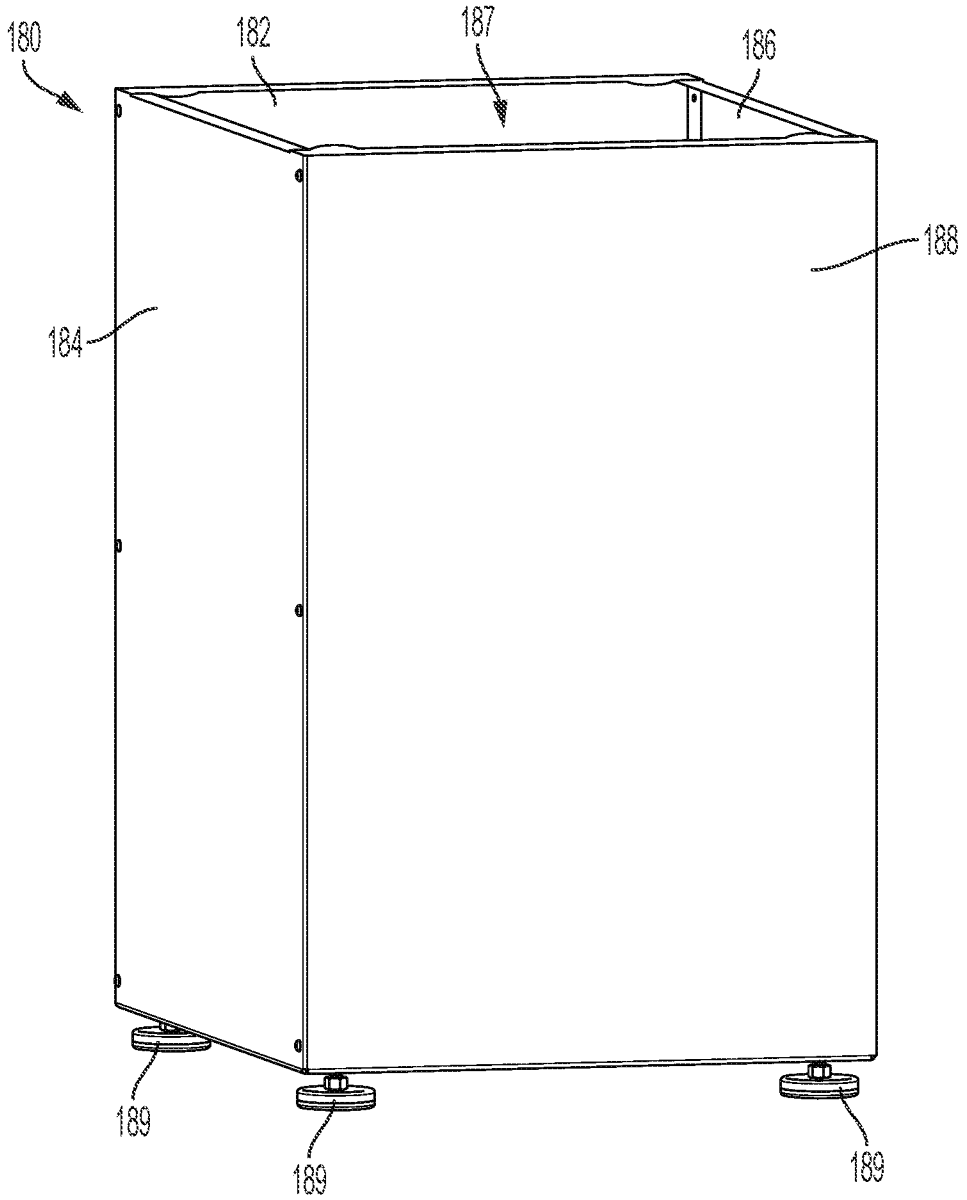
FIG. 4A shows a front perspective view of a riser that can be used to support a device management cabinet at an elevated height under one embodiment.

FIG. 4A shows a front perspective view of a riser 180 that can be used to support a device management cabinet at an elevated height under one embodiment. The riser 180 can comprise a front wall 188, a first side wall 184, and second side wall 186, and a back wall 182. In embodiments, each of the walls 182, 184, 186, 188 can be vertically elongated to create an elevated riser 180. An elevated riser 180 such as that pictured in FIG. 4A can be particularly useful in supporting one or more short device management cabinets 100, 101, 102, 103, 104, 105 such as those shown in FIGS. 1A, 1B, 2C, and 2D. The riser 180 can comprise an internal space 187 that is centrally disposed between each of the walls 182, 184, 186, 188. Each of the walls 182, 184, 186, 188 can comprise an interior face that is oriented toward the internal space 187 of the riser 180. Each of the walls 182, 184, 186, 188 can further comprise an exterior face that is exposed to the exterior of the riser 180. It will be understood by those in the art that the interior face of each wall 182, 184, 186, 188 is opposite that of the exterior face. In certain embodiments, the riser 180 comprises one or more support stands 189. It should be understood that the riser support stands 189 can comprise any of the various features of support stands 140, 240 that are disclosed herein.

Figure 4B:
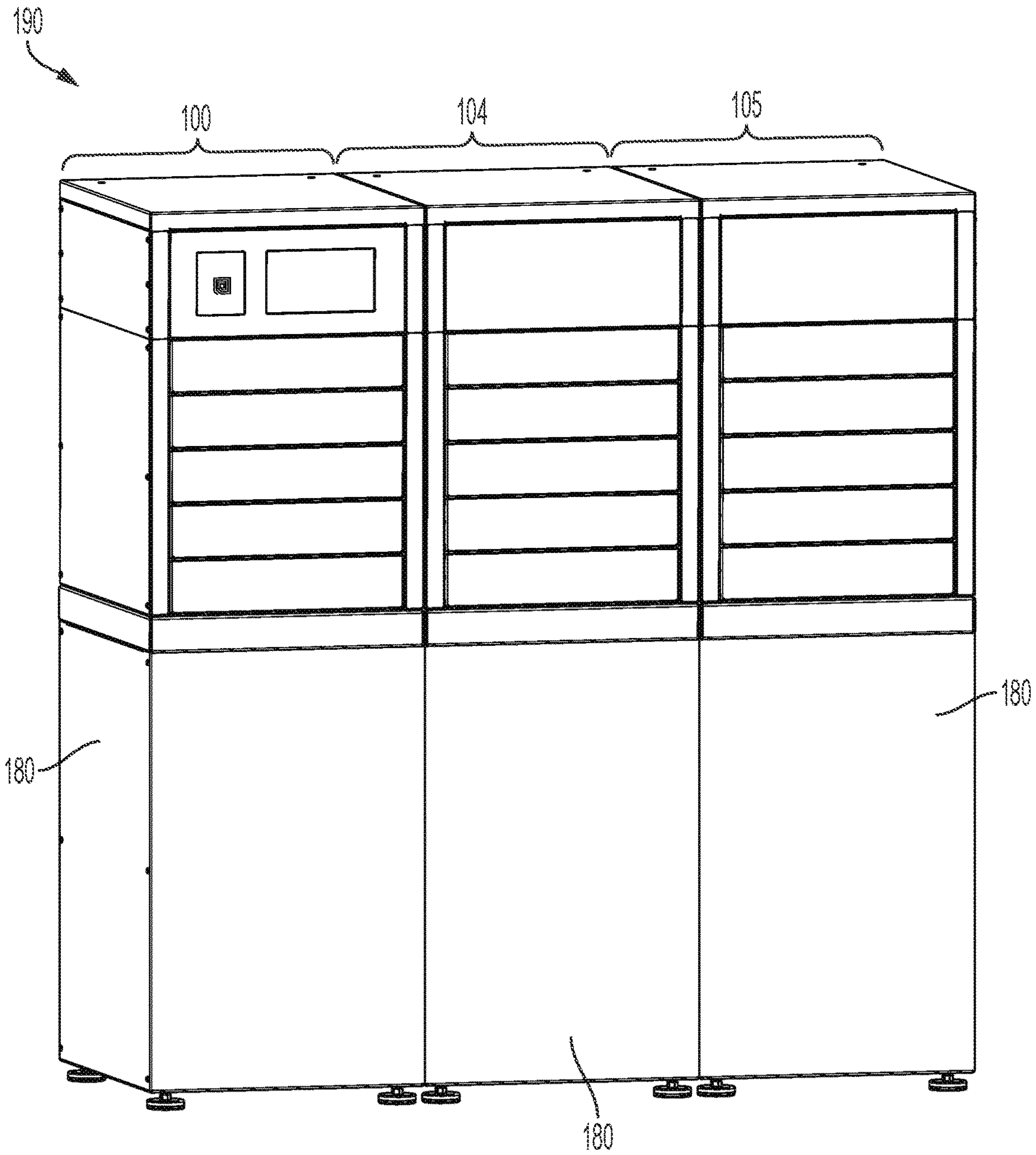
FIG. 4B shows a front perspective view of the fifteen-compartment device management system of FIG. 2D being supported by three risers from the FIG. 4A embodiment.

FIG. 4B shows a front perspective view of a fifteen-locker compartment device management system 190(such as that shown in FIG. 2D) being supported by three risers 180 from the FIG. 4A embodiment.

Figure 5A:
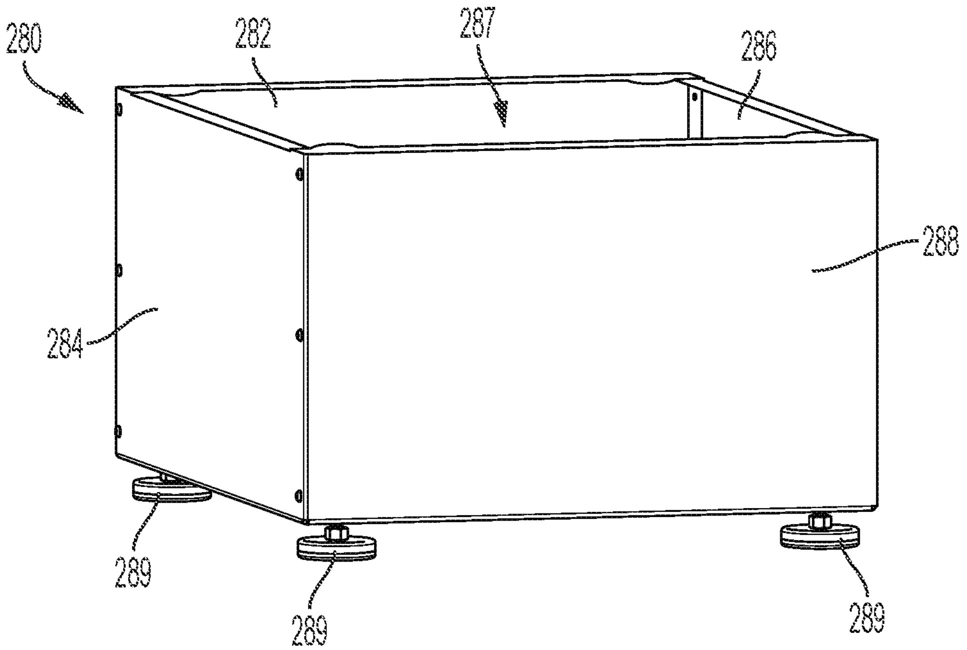
FIG. 5A provides a front perspective view of a riser that can be used to support a device management cabinet at an elevated height under another embodiment.

FIG. 5A shows a front perspective view of a riser 280 that can be used to support a device management cabinet at an elevated height under another embodiment. The riser 280 can comprise a front wall 288, a first side wall 284, and second side wall 286, and a back wall 282. In embodiments, one or more of the walls 282, 284, 286. 288 can be elongated lengthwise to create a short riser 280. A short riser 280 such as that pictured in FIG. 5A can be particularly useful in supporting tall device management cabinets 200, 201 such as those shown in FIGS. 2A, 2B, 3A, and 3B. The riser 280 can comprise an internal space 287 that is centrally disposed between each of the walls 282, 284, 286, 288. Each of the walls 282, 284, 286, 288 can comprise an interior face that is oriented toward the internal space 287 of the riser 280. Each of the walls 282, 284, 286, 288 can further comprise an exterior face that is exposed to the exterior of the riser 280. It will be understood by those in the art that the interior face of each wall 282, 284, 286, 288 is opposite that of the exterior face. In certain embodiments, the riser 280 comprises one or more support stands 289. It should be understood that the riser support stands 289 can comprise any of the various features of support stands 140, 240 that are disclosed herein.

Figure 5B:
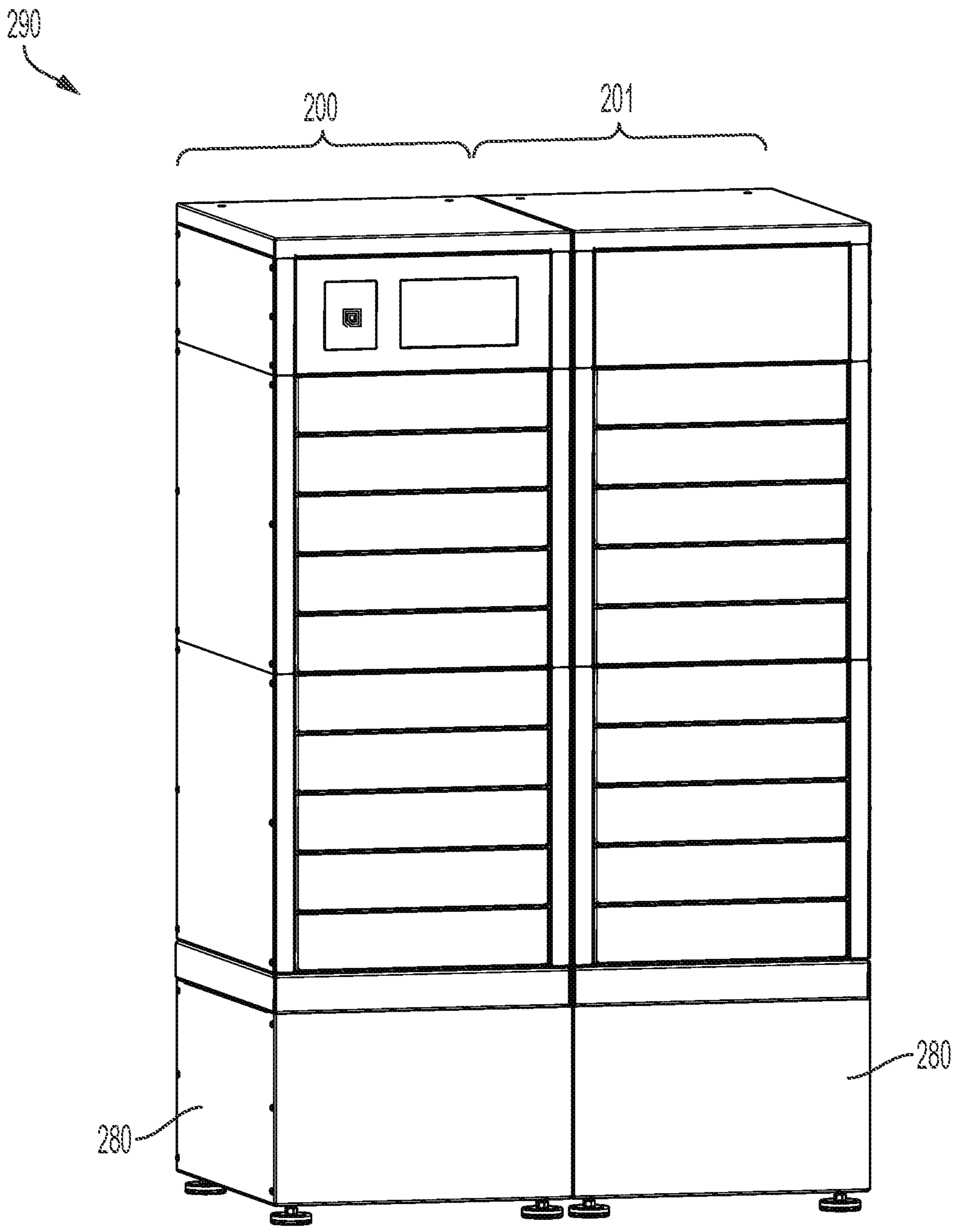
FIG. 5B shows a front perspective view of the twenty-compartment device management system of FIG. 3B being supported by two risers depicted in the FIG. 5A embodiment.

FIG. 5B shows a front perspective view of the twenty-compartment device management system 290 (such as that of FIG. 3B) being supported by two risers 280 from the FIG. 5A embodiment.

With regard to FIGS. 4B and 5B, although more than one riser 180, 280 is shown supporting the device management cabinets 100, 104, 105, 200, 201, alternate embodiments can comprise a single riser that is horizontally elongated to support more than one device management cabinet. In such embodiments, the horizontally elongated riser can comprise a length that permits the riser to be substantially flush with the combined length of a plurality of device management cabinets. In certain embodiments, the riser 180, 280 can comprise one or more drawers, bins, lockers, or the like.

Figure 6A:
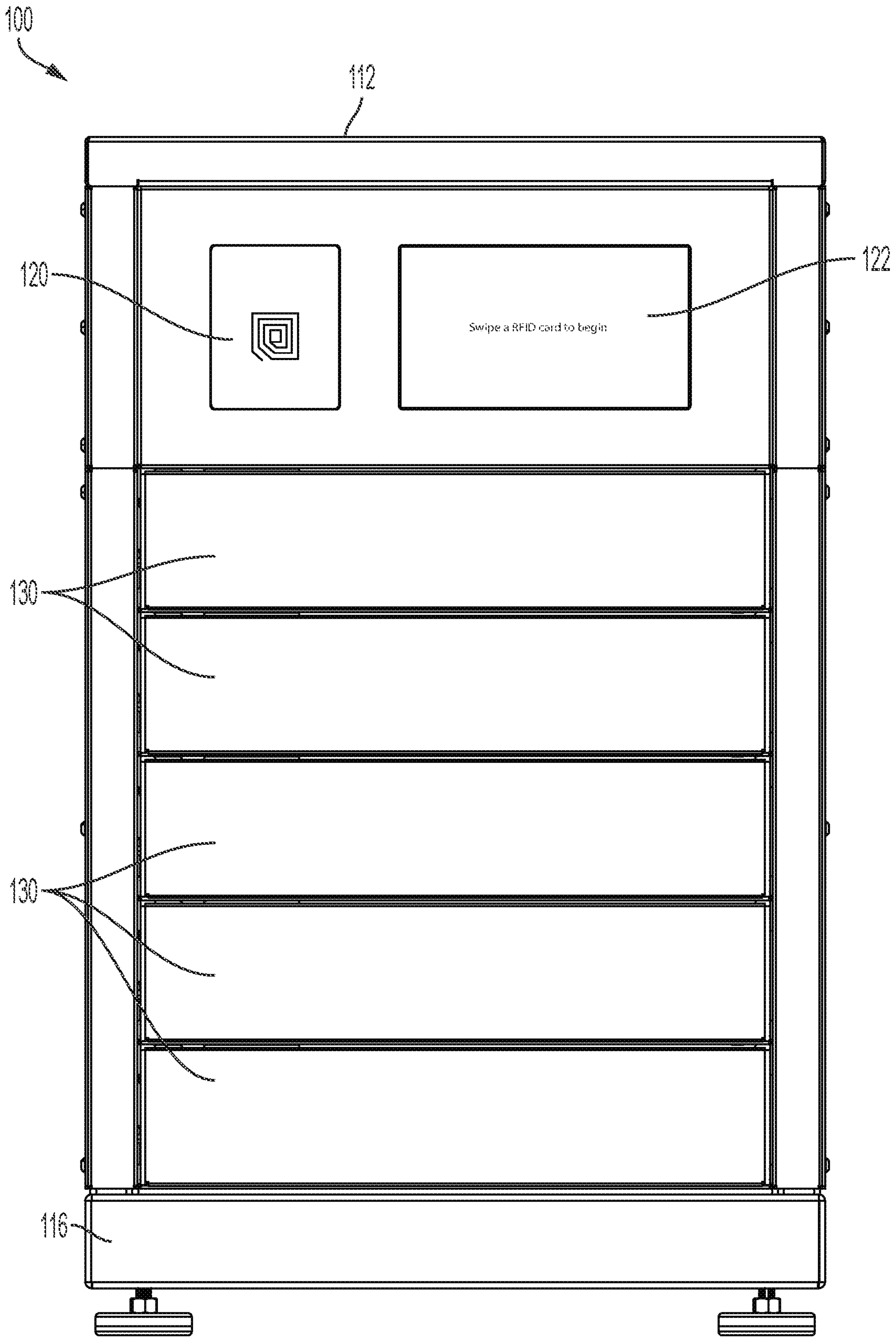
FIG. 6A provides a front view of a five-compartment device management cabinet under one embodiment.
Figure 6B:
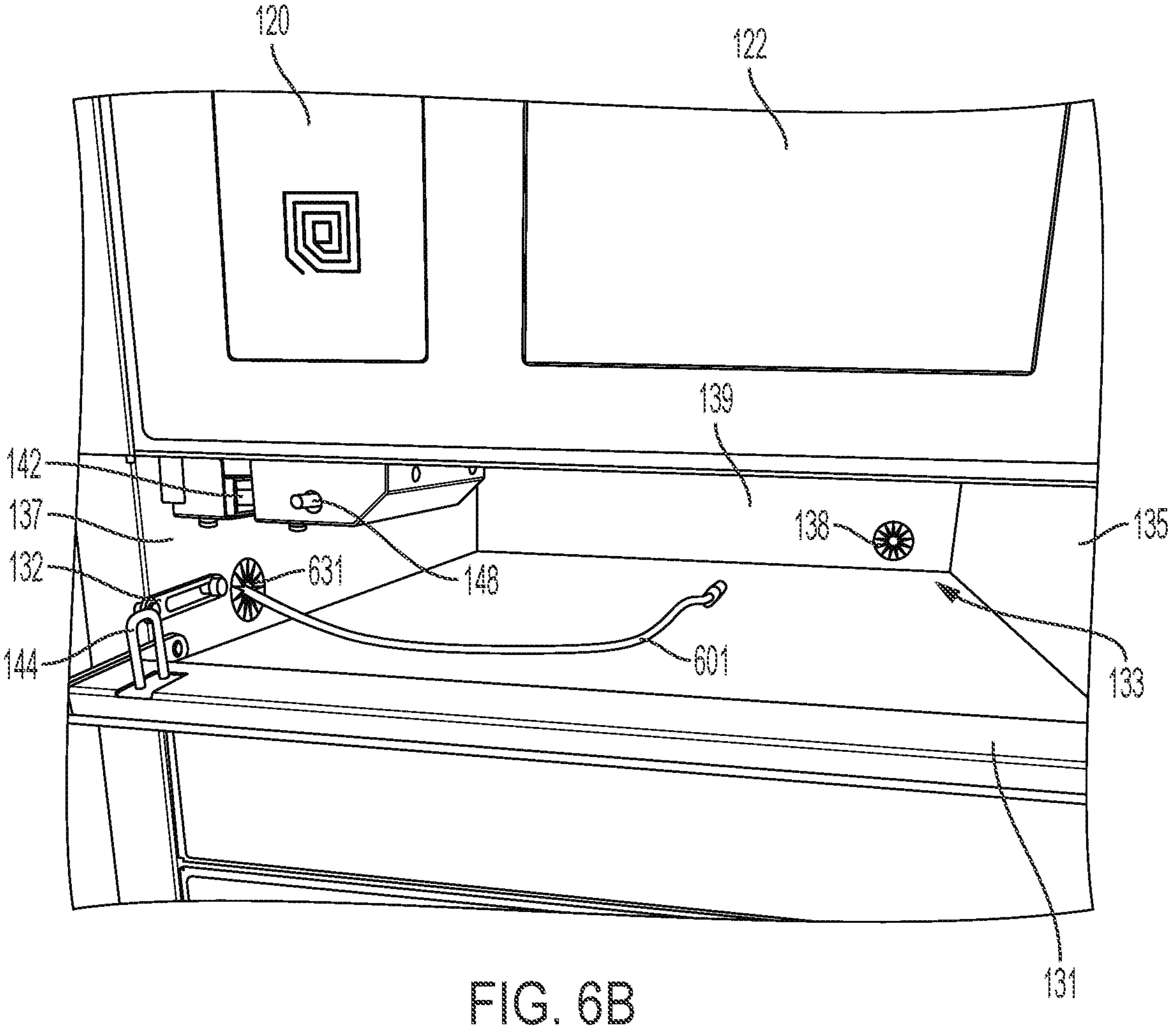
FIG. 6B shows a close-up, view of the top locker compartment of the FIG. 6A embodiment in an open position.

FIG. 6A provides a front view of a five-compartment device management cabinet 100 under one embodiment, and FIG. 6B shows a close-up view of the top locker compartment of the FIG. 6A embodiment in an open position. As can be seen, each locker compartment 130 comprises an open internal space 133 that is defined by a first locker compartment side surface 135, a second locker compartment side surface 137, a back surface 139 of the locker compartment, and the door 131 of the locker compartment. The interior space 133 can be configured to receive and secure a device therein (as shown at 500 in FIGS. 1B and 2B). Each locker compartment 130 comprises a door 131 that can be opened and closed to access the interior space 133 of the locker compartment.

The interior 133 of the locker compartment can comprise at least a portion of a data cable 601 that is configured to be connected to a device 500. In embodiments, the data cable 601 is configured to transfer data from the device to the processor 450, transfer data from the processor 450 to the device 500, transfer power to the device 500, or a combination thereof. In certain embodiments, "data cable," as used herein can refer to a cable that is only capable of transmitting power to a device 500.

Each locker compartment 130 can comprise at least one data cable opening 631 for passage of a cable or cord therethrough. In embodiments, the at least one data cable opening 631 is configured to permit passage of a data cable 601 therethrough. In certain embodiments, the at least one data opening is disposed along a side surface 137 of the locker compartment. Alternatively, the at least one data cable opening 631 is disposed along the first side surface 135, or the back surface 139. Embodiments can comprise a second opening 138. In embodiments, the second opening 138 is disposed on a surface of the locker compartment that is different from the surface that comprises the at least one data cable opening 631. The second opening 138 can be disposed on the back surface 139 of the cabinet 100.

As detailed below, one or more locker compartments 130 can comprise a locking mechanism (seen at 640 of FIG. 8) that can be selectively locked/unlocked to restrict access to the given locker compartment 130. Under embodiments, the locking mechanism 140 comprise a latching system that includes a latchbolt 144 configured to be reversibly secured within a recess of a latch receiver 142. In embodiments, the latchbolt 144 is disposed on the door 131 of the locker compartment 130 and the latch receiver 142 is disposed within the interior space 133 of the locker compartment 130.

As seen in the FIG. 6B embodiment, the door 131 of one or more locker compartments 130 can be configured to open in the vertical direction. In such embodiments, the locker compartment 130 can be configured such that, when unlocked, the door 131 is allowed to fall gravitationally to an open position. Such vertically opening doors 131 can comprise a door keeper 132 at the lateral-most portions of the locker compartment to ensure that the door 131 does not rotate beyond a given degree when opened. Vertical doors can further comprise at least one laterally disposed hinge to permit vertical opening of the door 131. Alternatively, the door 131 may be configured to be pulled in the downward direction for opening of the same. In alternate embodiments, the door is configured to open horizontally when unlocked.

Figure 6C:
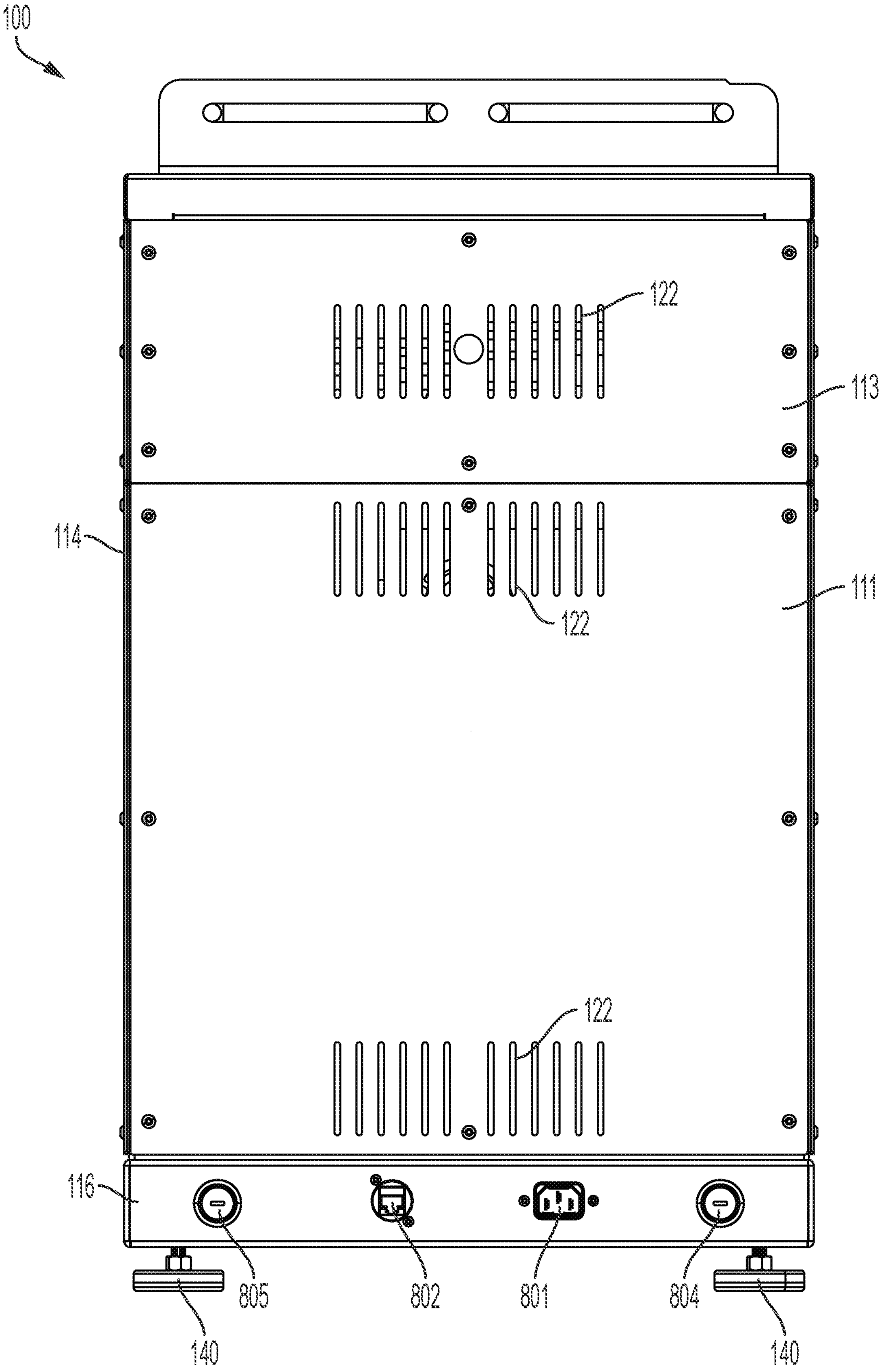
FIG. 6C shows a back view of a device management cabinet under one embodiment.

FIG. 6C shows a back view of a device management cabinet 100 under one embodiment. As can be seen, the back of the cabinet 100 can comprise a back top panel 113, a back lower panel 111, and a base 116. Two back support stands 140 are also visible extending from the base 116. Further the top panel 113, lower panel 111, or both can comprise one or more vents 122 that are configured to permit airflow and thermal management for electronics that can be disposed behind the back exterior panels 111, 113. The cabinet 100 comprises an alternating current (AC) inlet port 801 configured to receive power from an AC power cord. The cabinet 100 can comprise a broadband data port 802. The broadband data port 802 can comprise any port capable of receiving a broadband signal. In embodiments, the broadband data port 802 comprises an ethernet port. Advantageously, certain device management systems 150, 260 that comprise one main device management cabinet 100, 200 and one or more auxiliary cabinets 101, 102, 103, 104, 105, 201, are configured such that only the main device management cabinet 100 requires the AC inlet port 801, the broadband data port 802, or a combination thereof. Thus, in such embodiments, power, broadband connectivity, or both are transferred through the main device management cabinet 100, 200 to the one or more auxiliary cabinets 101, 102, 103, 104, 105, 201. Certain embodiments permit the transfer or exchange of data between the main device management cabinet 100, 200 to the one or more auxiliary cabinets 101, 102, 103, 104, 105, 201 without the transfer of power. In such embodiments, each of the one or more auxiliary cabinets 101, 102, 103, 104, 105, 201 can be directly connect to a power source.

Figure 7:
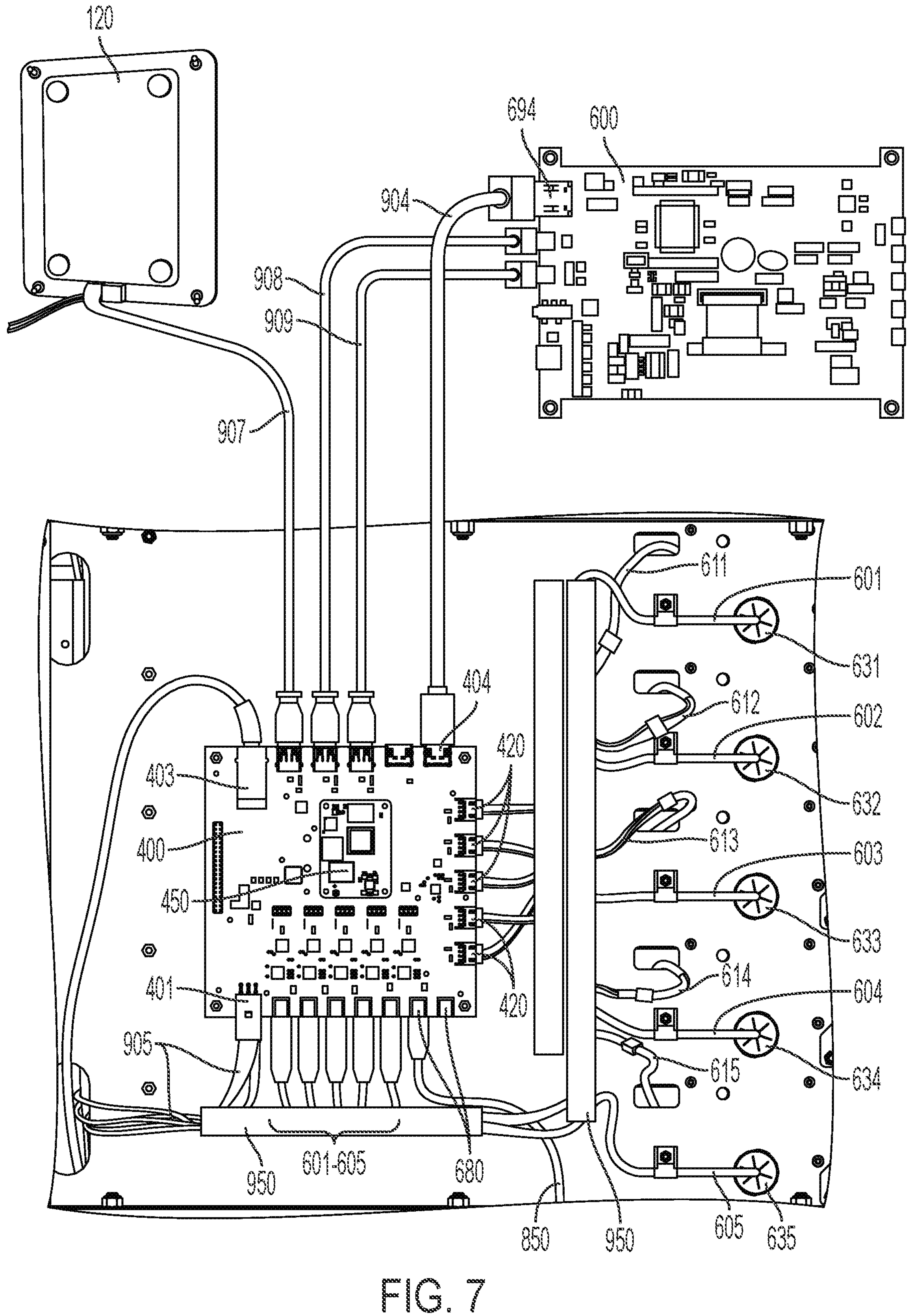
FIG. 7 shows a detailed view of a main printed circuit board, a display printed circuit board, the back of a radio frequency identification reader, and the data and power connections therebetween under one embodiment.

In embodiments, the main device management cabinet 100 comprises one or more data cable ports 804, 805 that connect the cabinet 100 to at least one data cable port 804, 805 on one or more auxiliary cabinets 101, 102, 103, 104, 105, 201, such as via one or more auxiliary cabinet cables (seen at 850 of FIG. 7). Such data cable ports 804, 805 can be configured to permit the exchange of data between the main device management cabinet 100, 200 and one or more auxiliary cabinets 101, 102, 103, 104, 105, 201. In embodiments with at least two auxiliary cabinets 101, 102, 103, 104, 105, 201, one or more auxiliary cabinets 101, 102, 103, 104, 105, 200, 201 comprise at least two data cable ports 804, 805, wherein one data port 804 is configured exchange data with the main device management cabinet 100, and the other data port 805 is configured to exchange data with at least one other auxiliary cabinet 100, 101, 102, 103, 104, 105, 200, 201. Embodiments can permit the transfer of data between up to 50 cabinets 100, 101, 102, 103, 104, 105, 200, 201. Embodiments of device management systems permit the transfer of data between 2, 3, 4, 5, 6, 7, 8, 9, or 10 cabinets, wherein one of the cabinets comprises a main device management cabinet 100, and the remaining one or more cabinets are auxiliary cabinets 101, 102, 103, 104, 105, 200, 201.

These data cable ports can comprise any of the various connectors disclosed herein. By way of example, one or more data cable ports can comprise a connector of any one or more of the following types: USB, USB-A, USB-B, USB-C, micro-USB, mini-USB, lightning (such as that used for iPhone®, iPad®, and other similar devices), coaxial, optical, HDMI, component video, S-video, composite video, digital visual interface, broadband (such as ethernet). It is contemplated that any type of connectors can be used to communicatively couple any of the various device management cabinets 100, 101, 102, 103, 104, 105, 200, 201 disclosed herein into a single device management system. In embodiments, the data cable ports 804, 805 can be configured to transfer data, power, or both data and power from one cabinet to another cabinet. In certain embodiments, cabinets are communicatively coupled via any of the wireless connection protocols disclosed herein. Wireless connections can be used in the alternative to or in combination with wired connections to communicatively couple separate device management cabinets into a single device management system. Embodiments are provided that permit a plurality of device management cabinets to be controlled via a single user interface 120, 122, 220, 222. In embodiments, the single user interface 120, 122, 220, 222 is disposed on one of the device management cabinets within the plurality of device management cabinets. The single user interface 120, 122, 220, 222 can be disposed within or upon the main device management cabinet 100, but not on any of the one or more auxiliary cabinets 101, 102, 103, 104, 105, 201.

Figure 6D:
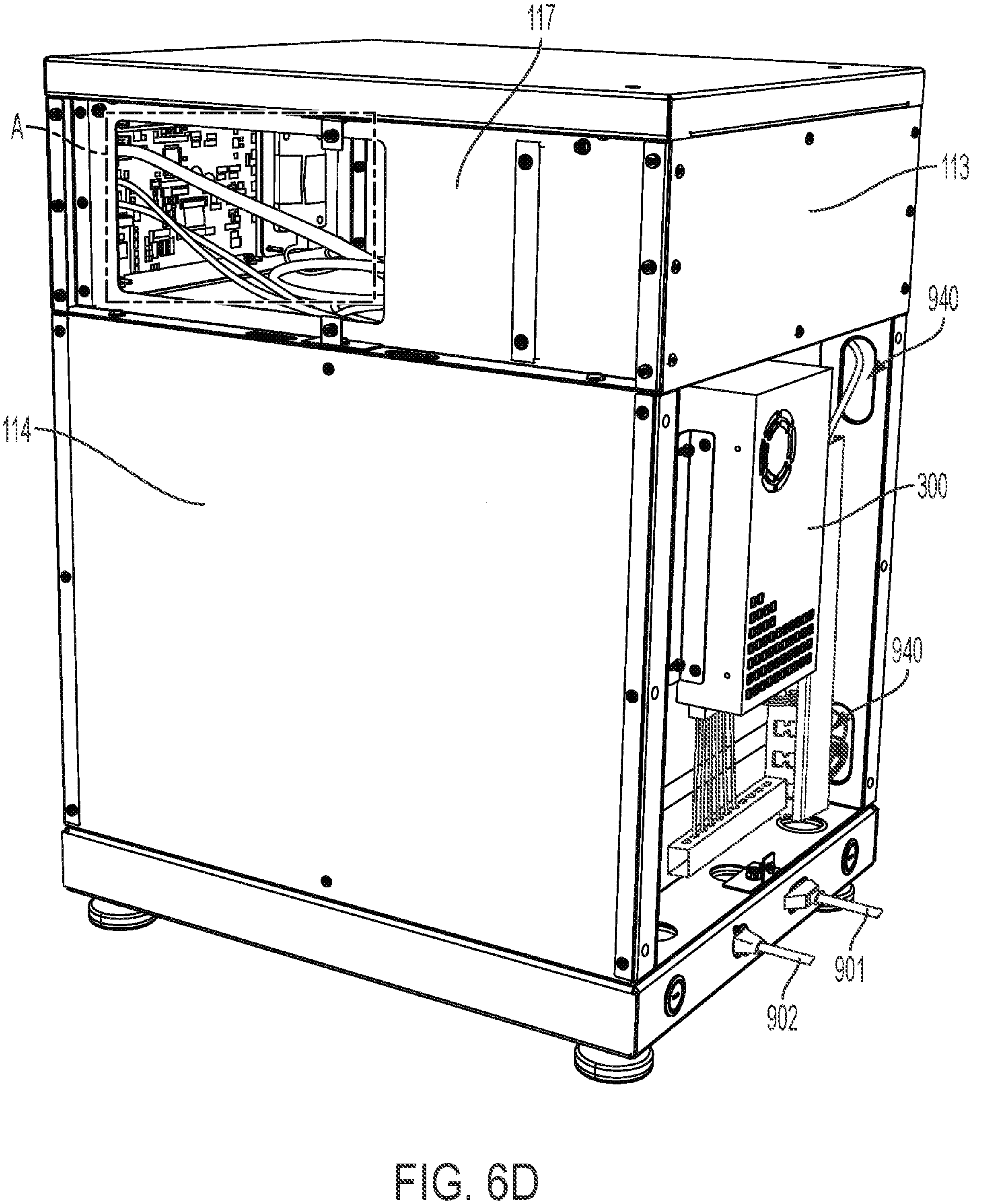
FIG. 6D provides a back, side perspective view of the FIG. 6A embodiment.

FIG. 6D provides a back, side perspective view of the device management cabinet 100 from FIG. 6A, with the lower exterior back panel (seen at 111 of FIG. 6C) and the upper exterior side panel (seen at 115 of FIG. 1A) removed. A power cord 901 and a broadband cable 902 can be seen attached to the AC inlet port 801 and broadband data port 802, respectively. The cabinet 100 can include an alternating current to direct current ("AC/DC") power converter 300 to power one or more printed circuit boards (PCB) (seen at 400 of FIG. 6F and 600 of FIG. E) and to further provide power to one or more devices 500 via a device data cable (seen at 601-605 of FIG. 6G). In embodiments, the AC/DC power converter 300 receives 120 VAC input power from a power cord 901, and converts the 120 VAC into DC power, which is transferred to a PCB (seen at 400 in FIGS. 6F, 6G and 7) via one or more DC power cables 905. In certain embodiments, at least one of the auxiliary cabinets comprise an AC/DC power converter and an associated AC inlet port.

As can be seen, the device management cabinet 100 can comprise an interior upper side panel 117. In such embodiments, the interior upper side panel 117 can comprise a window, for access to the display 122 or a display PCB (seen at 600 of FIG. 6E), the back side of the means for authenticating a user (seen at 120 of FIG. 6E), or a combination thereof.

Figure 6E:
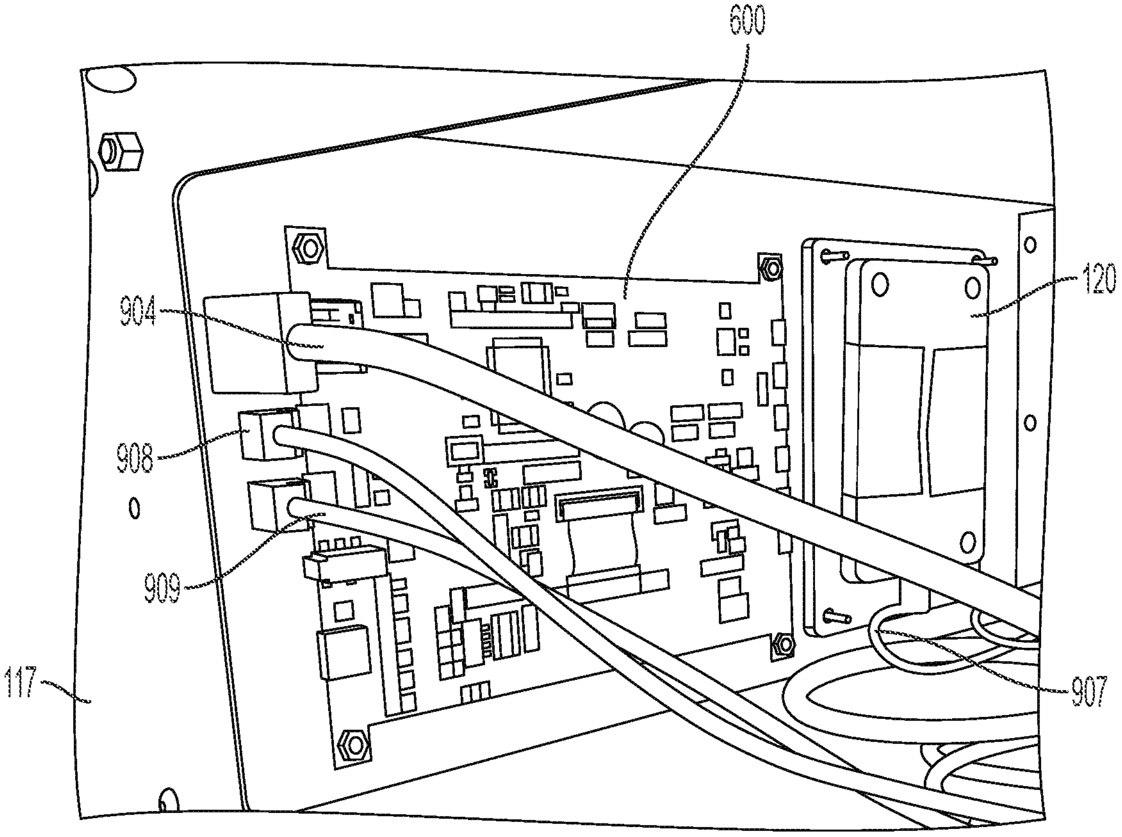
FIG. 6E shows a close-up view of an access panel taken from square A of FIG. 6D.

FIG. 6E shows a close-up view of an access window taken from square A of FIG. 6D. A display PCB 600 can be seen mounted on the inside of the front surface of the cabinet. A display data cable 904 is shown connected to the display PCB 600 at a data cable port (seen at 404 of FIG. 6G). The display data cable 904 can comprise a cable configured to transmit video, audio, or other data between the display 122 and the main PCB (seen at 400 of FIGS. 6F, 6G and 7), the processing system, or a combination thereof. In embodiments, the display data cable 904 is configured to transmit audio, video, or a combination thereof from the main PCB 400 or processing system. The display data cable 904 can comprise an HDMI cable. The cabinet 100 can further comprise a cable 909 that is configured to supply power to the display 122. In embodiments wherein the display 122 comprises a touch screen, a second display data cable 908 can be connected to the display PCB 600 for transmitting touch data to the main PCB 400 or the processing system. Embodiments comprise a display data cable 904, a second display data cable 908, a display PCB power cable 909, or a combination thereof.

Also, with reference to FIG. 6E, the back side of a means for authenticating a user 120 can be seen mounted adjacent to the display PCB 600. In the embodiment, an authentication data cable 907 is attached to the means for authenticating a user 120 and transmits user authentication data to the main PCB (seen at 400 in FIGS. 6F, 6G, and 7) or processing system. In the pictured embodiment, the means for authenticating a user 120 comprises an RFID reader and the data cable is configured to carry RFID reader authentication data therein; however, embodiments within the present disclosure can include any means for authenticating a user that are disclosed herein or otherwise known in the art.

Figure 6F:
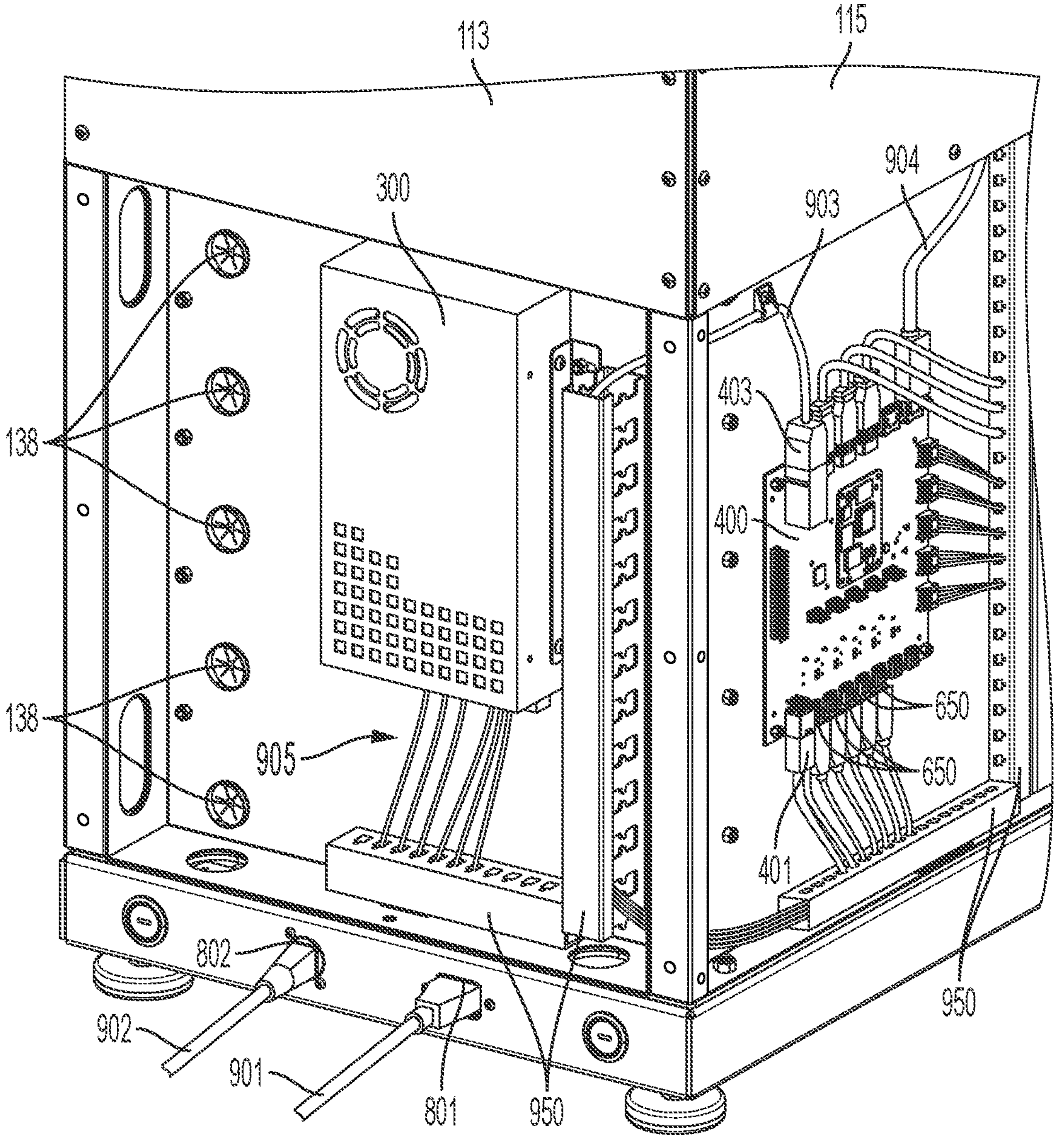
FIG. 6F shows a partial view of one of the back corners of the FIG. 6A embodiment with no external panels on the lower portion of the device management cabinet. A processor can be seen mounted to the back side of the locker compartment, and a circuit board with cables connected thereto can be seen on one side of the cabinet.

FIG. 6F shows a partial view of one of the back corners from the device management cabinet 100 of the FIG. 6A embodiment. In this view, the external panels are removed from the lower portion of the device management cabinet 100, and the upper panels 113, 115 remain in place. The power converter 300 is shown mounted within the housing of the back side of the cabinet 100, and power cord 901 and broadband cable 902 can be seen attached to the AC inlet port 801 and broadband data port 802, respectively. A plurality of data cable openings 138 can be seen along the back surface of the cabinet. In embodiments, the number of data cable openings 138 is equal to the number of locker compartments 130 within the device management cabinet 100. A plurality of cable organizers 950 can be seen within the cabinet 100 housing, which serve to organize any one or more cables disclosed herein. A main printed circuit board 400 is shown within the housing of one side of the data cabinet 100. A plurality of device data cables (seen more clearly at 601-605 of FIGS. 6G and 7) are shown connected to the main PCB 400 via a plurality of data cable ports or jacks 650. In embodiments, the ports or jacks 650 for the device data cables (seen at 601-605 of FIGS. 6G & 7) comprise one or more USB jacks. An internal broadband cable 903 is shown extending from the housing of the back surface (through a data cable opening, which can be seen at 940 of FIG. 6G), into the housing of the side surface, wherein the broadband cable 903 connects to the main PCB 400 processing system via a broadband port or jack 403. In addition, a display data cable 904 can be seen connected to the main PCB 400.

Figure 6G:
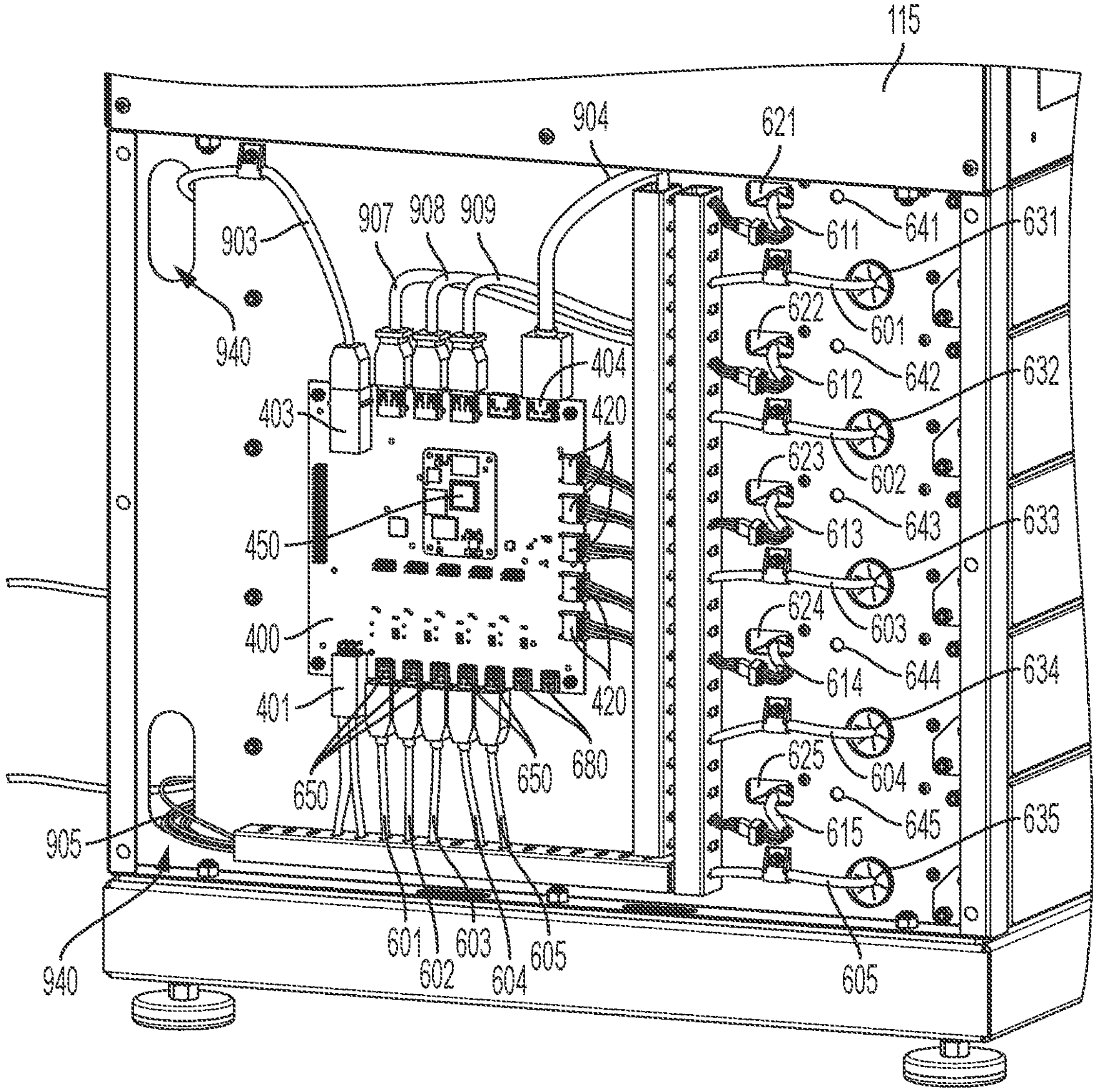
FIG. 6G provides a detailed view of the circuit board and cables shown in FIG. 6F.

FIG. 6G provides a detailed view of the main PCB 400 and cables shown in FIG. 6F. Embodiments can comprise openings 940 configured to permit cables to pass between various sides of the cabinet 100. By way of example, DC power cables 905 can be seen passing through a lower cable opening 940 from the back portion of the cabinet housing and into the side of the housing to join with the main PCB 400 via the header 401. Similarly, the internal broadband cable 903 is shown passing through an upper opening 940 to join with the broadband jack 403 of the main PCB 400. A processing system 450 can be seen connected to the main PCB 400, which serves as a processor for the systems and methods disclosed herein. Alternatively, the processing system can be separate from the main PCB. In embodiments, the processing system comprises a computing device that is not connected to or otherwise mounted on a main PCB. A plurality of device cables 601-605 are shown connected to a plurality of data port jacks 650. Each device cable 601-605 can extend from its respective data port jack 650, through its respective data cable opening 631-635, and into its respective locker compartment 130, wherein the data cable 601-605 can be configured to be connected to a device 500.

Embodiments can comprise at least one auxiliary cabinet jack 680 that, as discussed herein, can be utilized to connect one or more auxiliary cabinets to the main PCB 400. A display data cable 904, an authentication data cable 907, a second display data cable 908, and a display PCB power cable 909 are shown connected to their respective jacks within the main PCB 400.

As shown in the FIG. 6G embodiment, one or more locking mechanism jacks 420 can be connected to the main PCB 400 for control of the locking mechanism (as shown at 140 of FIGS. 6B and 8) for one or more locker compartments 130. Each of the one or more locker mechanism jacks 420 can be connected to a locker cable 611-615. In embodiments each locker cable 611-615 travels through its respective locker cable opening 621-625 to terminate in a locker mechanism 140 for the respective locker compartment 130. In embodiments, the number of locker mechanism jacks, locker cables, locker cable openings, or a combination thereof is equal to the number of locker compartments 130 available for a given device management cabinet 100.

FIG. 7 provides a simplified schematic showing the data and power connections between the main PCB 400, the display PCB 600, and the means for authenticating a user 120. In embodiments, user authentication data travels from the means for authenticating a user 120 through the authentication data cable 907 and enters the main PCB 400 at the authentication data port. Data can be exchanged between the display 122 and the processing system 450 via the display data cable 904 that is attached to the display data port 694 on the display PCB 600. In embodiments with a touch screen display 122, touch screen data can be transferred between the display 122 and the processing system 450 via a second data cable 908 that is linked with both the display PCB 600 and the main PCB 400, to which the processing system 450 is connected.

It is to be understood that, unless the applicable context suggests otherwise, any of the various connections or communicative coupling with the main PCB 400 that are described herein can be directly coupled to the processor or processing system 450. Similarly, any of the various connections or communicative coupling with the display PCB 600 that are described herein can be directly coupled to the display 122.

In various exemplary embodiments disclosed herein, 120 VAC power enters the power converter 300 from the power cord 901 and the AC inlet port 801. The AC power is then converted to DC power within the power converter 300 and exits the power converter via one or more DC power cables 905. The DC power cables 905 can then pass through at least one cable opening (seen at 940 of FIG. 6G) to another side of the cabinet 100 housing such that the DC power cables 905 terminate in a header 401 that provides power to the main PCB 400. Power can then be distributed from the main PCB 400 to the display PCB 600 via a power cable 909. Power can further be transferred from the main PCB 400 to one or more devices 500 via the device data cables 601-605.

Similarly, a broadband signal can be transmitted into the cabinet 100 through an external broadband cable 902 via the broadband port 802 disposed on an external surface of the cabinet 100 (such as the base 116). After entering the cabinet 100, the broadband signal can be transferred to the main PCB 400 via an internal broadband cable 903 that connects to a broadband PCB port 403. The main PCB 400 can then interact with the plurality of devices 500, the display 122, the means for authenticating a user 120, the processing system 450, one or more auxiliary cabinets 101-105, 201, or combination thereof via the communicative coupling disclosed herein.

In embodiments, the device management cabinet 100 comprises one or more auxiliary data cables 850 that connect the cabinet 100 to at least one data cable port 804, 805 on one or more auxiliary cabinets 101, 102, 103, 104, 105, 201. In embodiments with at least two auxiliary cabinets 101, 102, 103, 104, 105, 200, 201, one or more auxiliary cabinets 101, 102, 103, 104, 105, 201 comprise at least two auxiliary data cables 850, wherein one data cable 850 is configured to exchange data with the main device management cabinet 100, and the other auxiliary data cable 850 is configured exchange data with at least one other auxiliary cabinet 101, 102, 103, 104, 105, 200, 201. Thus, such embodiments permit the serial transfer of data first from the main device management cabinet 100, 200 to a first auxiliary cabinet 101, and then to a second auxiliary cabinet 102, and so forth. In these embodiments, the second auxiliary cabinet 102 can be indirectly connected to the processing system 450 of the main device cabinet by way of passing through the first auxiliary cabinet 101. In alternative embodiments, each of the at least two auxiliary data cabinets 101, 102, 103, 104, 105, 201 is directly connected to the processing system 450 of the main device cabinet 100, 200.

Similarly, certain embodiments can permit the transfer of power from the main device management cabinet 100, 200 to one or more auxiliary cabinets 101, 102, 103, 104, 105, 201. Further, the main device cabinet 100, 200, one or more auxiliary cabinets 101, 102, 103, 104, 105, 201, or both can comprise one or more power inlet or outlet ports, to permit the transfer of power to or from the main device management cabinet 100, 200, another auxiliary cabinet 101, 102, 103, 104, 105, 201, or a combination thereof. In such embodiments, a power cable can transmit power between cabinets 100, 101, 102, 103, 104, 105, 200, 201. For instance, a power cable can transmit power from the main device management 100, 200 to at least one auxiliary cabinet 101, 102, 103, 104, 105, 201 or vice versa. Power can then be transferred via a power cable to second auxiliary cabinet 101, 102, 103, 104, 105, 201, the main device cabinet 100, 200, or a combination thereof. Thus, embodiments permit the serial transfer of power first from the main device management cabinet 100 to a first auxiliary cabinet 101, then to a second auxiliary cabinet 102, and so forth.

Device cables 601, 602, 603, 604, 605 can be any of the various cables typically associated with any all types of devices 500. In certain embodiments, the various cords or cables disclosed herein comprise connectors of any one or more of the following types: USB, USB-A, USB-B, USB-C, micro-USB, mini-USB, lightning (such as that used for iPhone®, iPad®, and other similar devices). It is contemplated that any type of cables and connectors may be used with any of the various device management cabinents 100, 101, 102, 103, 104, 105, 200, 201 disclosed herein.

Figure 8:
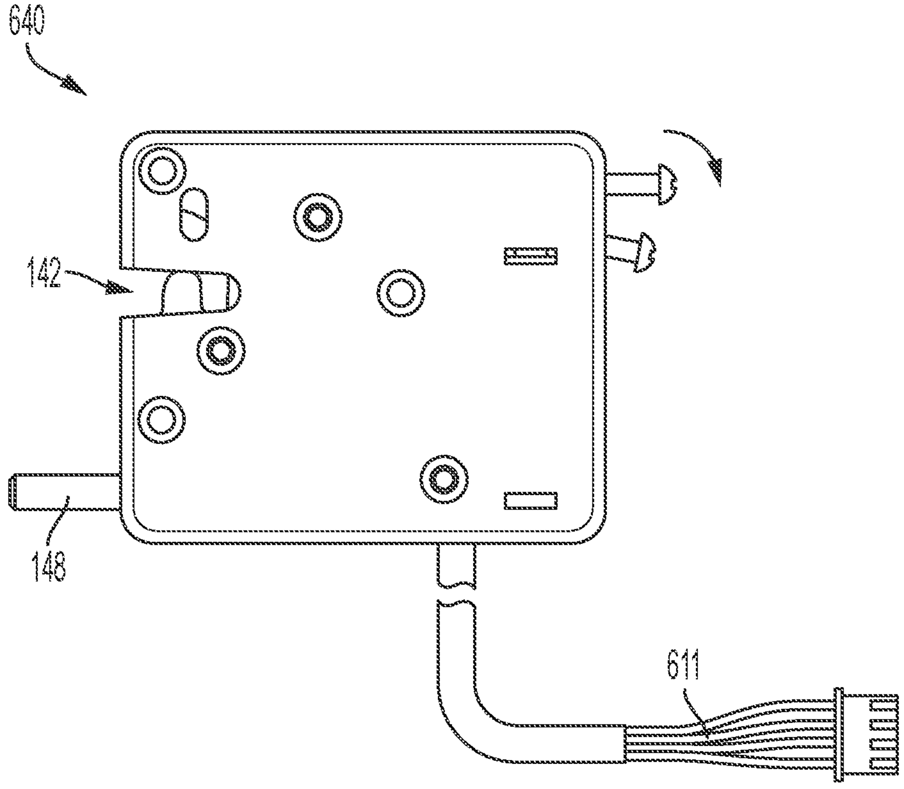
FIG. 8 provides a schematic of an exemplary locking mechanism used in one embodiment of the present disclosure.

FIG. 8 provides a schematic view of a locking mechanism 140 that can be used in certain embodiments of the present disclosure. The locking mechanism 140 can be selectively locked or unlocked to restrict access to a given locker compartment 130. As can be seen, the locking mechanism 140 can comprise a latch receiver 142 that is configured to receive and reversibly secure a latchbolt 144 therein. In certain embodiments, the locking mechanism 140 automatically locks the locker compartment 130 when the locker door 131 is closed and the latchbolt 144 is received within the latch receiver 142. In such embodiments, the locking mechanism can be unlocked following receipt of an electrical current form the main PCB 400 to the locking receiver 142. For instance, the unlocking current can be initiated by a signal from the processor 450 to a transistor, which generates an electrical current to interact with a solenoid, which then unlatches the latch receiver 142 and release the latchbolt 144, which permits the locker door 131 to be opened.

Certain embodiments can comprise a means for manually locking or unlocking one or more locker compartments 130, 230. Embodiments can comprise a means for manually unlocking at least one locker compartment. The means for manually unlocking at least one locker compartment can comprise a hole, gap, passthrough, or notch that permits selective access to the locking mechanism 140 within the locker compartment (seen at 641-645 of FIG. 6G).

Figure 9:
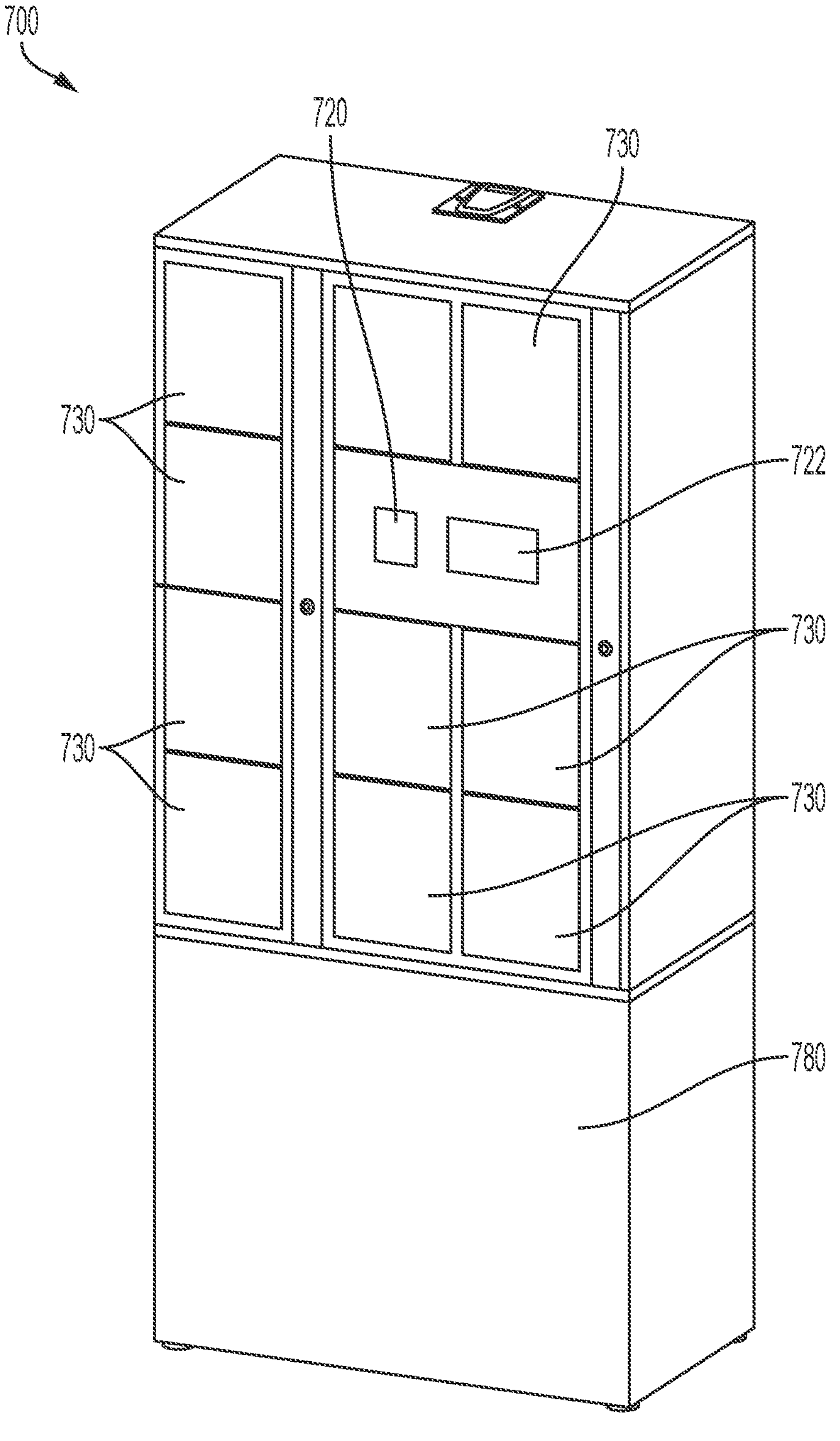
FIG. 9 shows a front perspective view of a ten-compartment device management cabinet under another exemplary embodiment.

FIG. 9 shows a front perspective view of a device management cabinet 700 under an embodiment with ten locker compartments 730 that are arranged in an alternate configuration. In the exemplary arrangement, the means of authenticating a user 720 and the display 722 are disposed underneath two locker compartments and to the right of another locker compartment. This pictured configuration can be particularly useful for locker compartments 730 with doors that are configured to open horizontally. The device management cabinet 700 is also shown on a riser 780 that serves to position the cabinet 700 at an elevated height. It should be understood that certain embodiments may lack the riser 780.

In methods of accessing a device 500 stored within a locker compartment 130, 230, 730 of a device management cabinet, a user can begin the process by authenticating the user's right to access the device 500 via the means of authenticating a user 120. In embodiments, the user employs the means of authenticating a user 120 to send an authentication signal to the main PCB 400 via the authentication cable 907. In one embodiment, following authentication of the user, the processing system 450 directly selects a locker compartment 130 to unlock and instructs the applicable transistor to generate the unlocking electric current to unlatch a latch receiver 142 to release the latchbolt 144, which permits the locker door 131 of the selected locker compartment 130 to be opened. Embodiments can comprise any unlatching means known in the art or later developed. The unlatching means can comprise a relay or any other electrical stimulus or pulse to effect unlatching of a latch mechanism.

In embodiments, the processing system 450 can comprise a memory device or subsystem, which can be used to store or record (1) the type of device 500 within a given locker compartment 130, (2) which locker compartments 130 comprise a device 500 therein, (3) which locker compartments 130 do not contain a device 500, (4) or a combination thereof. Thus, in such embodiments, following authentication of a user and prior to instructing the applicable transistor, the processor 450 may accesses the memory device or subsystem to determine an appropriate locker compartment 130 that contains a device 500, to determine that a given locker compartment contains an appropriate device 500, or a combination thereof.

In alternate embodiments, following authentication of a user, the processor 450 can exchange data with the display PCB 600 and display 122 via the display data cable 904 to present a user interface to the user. In such embodiments, the user can then select an appropriate locker compartment 130 (such as with a mouse, a keyboard, a touchscreen, or a combination thereof). Following selection of the locker, data from the user interface module can be transferred from the display PCB 600 to the main PCB 400 via the second display data cable 908. The processing system 450 instructs the applicable transistor to generate the unlocking electric current to unlatch a latch receiver 142 and release the latchbolt 144 of the user-selected locker compartment 130.

The locking mechanism 140 can further comprise a spring lever 148 that assists with opening of a locker door 131. In such embodiments, the spring lever 148 can be positioned such that, when closed, the door 131 depresses the spring lever 148 in a compressed state. The spring lever 148 can be configured to be released upon transmission of the unlocking electric current that unlatches the latch receiver 142. Thus, under such embodiments, when the spring lever 148 is released from its compressed state, the spring lever 148 assumes a non-compressed, extended state (as shown in FIGS. 6B and 8), which permits the spring lever 148 to push against the door 131 to encourage or otherwise assist with opening of the locker compartment 130. In one exemplary embodiment, when the door 131 is closed and the latchbolt 144 is reversibly secured within the recess of the latch receiver 142, the interior face of the door depresses the spring lever 148, which is maintained a compressed state via the cooperative action of the door 131 and the latchbolt 144. Thus, when the door 131 is in a locked position, potential energy is stored in the compression of the spring lever 148. Upon release of the latchbolt 141 as disclosed herein, the door 131 is unlocked, which releases the potential energy within the compression of the spring lever 148 as kinetic energy, and, as the spring level 148 decompresses, the spring lever 148 pushes against the interior surface of the locker door 131 to encourage or assist with opening of the locker 130. Under such embodiments, the spring lever 148 functions via mechanical compression resulting from closure of the locker door 131, and is not communicatively coupled to the processing system 450 or the main PCB 400. In alternate embodiments, the spring lever 148 can be communicatively coupled to the processing system 450, the main PCB 400, or a combination thereof. The spring lever 148 can be communicatively linked to the main PCB 400 or the processing system 450 via the applicable locker cable 611-615 connected to the applicable locking mechanism 140.

In embodiments, the device management cabinets disclosed herein comprise at least one sensor configured to detect whether a locker compartment door 131 is open or closed. The sensor can communicate whether the door is open or closed to the main PCB 400, the processing system 450, or both via an open or closed circuit. For instance, the sensor can employ a binary output, such that, when the door is open, there is no voltage, and when the door is closed, voltage is present (or vice versa). In embodiments the sensor can be disposed within the locking mechanism 140, itself. The sensor can be disposed within the latch receiver 142. In certain embodiments, the spring lever 148 serves as a sensor.

The sensor can be communicatively linked to one or more processors 450, such that the sensor transmits data to the processor 450 regarding whether a particular locker compartment is open or closed. In embodiments, the sensor, the processor 450, or a combination thereof are linked to an alert system that is configured to alert a user when a given compartment 130, 230, 730 is left in an opened state. By way of non-limiting example, the sensor, the processor 450, or both can comprise a timer that notifies a user that the compartment 130, 230, 730 is open after a set time has passed. The sensor can be configured to notify the user after a compartment door 131 has been open for at least 30 seconds. The set time before the user is alerted of an open door can be between about 10 seconds and about 10 minutes, inclusive. In embodiments, the set time is about 15 second, about 30 seconds, about 45 seconds, or about 60 second. The set time can be about one minute, about two minutes, about three minutes, about four minutes, or about five minutes. The set time can comprise any period of time greater than five minutes. The sensor can comprise any means known in the art to notify a user when a compartment is open or closed. The sensor can comprise a contact sensor that signals a closed state when the door is in physical contact with at least a portion of the sensor and signals an open state when the door is not in physical contact with at least a portion of the sensor. The sensor can comprise a pressure sensor. In embodiments, the sensor comprises a spring-loaded extension that is positioned such that, when closed, the door 131 depresses the sensor in a compressed state, and, when opened, the sensor assumes a non-compressed, extended state. Thus, in such embodiments, the sensor relays that the door is open when in a non-compressed, extended state, and the sensor relays that the door is closed when in a compressed state. In certain embodiments, the sensor comprises the spring lever 148 or is communicatively linked with the spring lever 148.

It should be understood that the number, arrangement, and configuration of the sensor as discussed herein is merely exemplary, and different embodiments comprising more or less sensors in alternate arrangements are envisioned. Each of the one or more sensors may activate in response to application of mechanical force, such as via the door 131 closing or otherwise pressing on a particular sensor or number of sensors. Note that sensors as disclosed herein can comprise transducers of various types, e.g., pressure transducers or piezoelectric transducers.

Throughout this disclosure, the terms "wall" and "panel" can be used interchangeably to refer to a support structure of any of the various embodiments disclosed herein. In certain embodiments any of the various walls or panels used on the cabinets disclosed herein are removable. In some embodiments, the walls or panels are reversibly secured to a frame of any of the various cabinets disclosed herein. The walls or panels can be reversibly secured to a frame via a mechanical fastener. In embodiments, the mechanical fastener comprises a screw, a tab, a bolt, a rivet, a nail, a nut, a key, an anchor, a stud, a ring, a pin, or any other fastener commonly used to secure panels. In certain embodiments, one or more of the walls or panels disclosed herein are integral with frame or otherwise irreversibly secured to the frame such that one or more walls or panels are not removable.

Certain embodiments can include one or more batteries or back up batteries for powering device management systems 150, 260. These embodiments can be particularly useful to maintain power to the cabinets 100, 101, 102, 103, 104, 105, 200, 201 during power outages.

Embodiments can comprise an inductive charging system, wherein the devices 500 are capable of being charged via an inductive charging system that is part of the device management cabinet 100, 101, 102, 103, 104, 105, 200, 201. Any of the various embodiments disclosed herein can comprise any of the known standards and specifications of wireless charging, including Wireless Power Consortium ("WPC") Qi™ standard.

Any one or more of the device management cabinets 100, 101, 102, 103, 104, 105, 200, 201 disclosed herein can comprise one or more primary coils, an electromagnetic interference ("EMI") shielding disposed around, beneath, over or adjacent to the primary coils.

The apparatuses, systems, and methods disclosed herein can collect and report data related to the device 500. Such device data can comprise the health status of the device, the battery status of the device, the battery life of the device, hours of use, identification of prior users of the device, current software system, update requirements, the presence or absence of malware on the device, prior locations of the device, transaction history on the device, or a combination thereof. Device data can comprise the serial number, make, or model of the device 500.

These data can be presented directly to a user through the integrated display 122, 222 on the front surface of the device management cabinet 100, 200. In embodiments, the device 500, the processing system 450, or a combination thereof are communicatively coupled to one or more applications running on at least one processor of a remote server. The device data may be transmitted to the remote server. A remote server application may receive device data from the processing system 450, the device 500, or a combination thereof. The remote server may receive data analytics performed by the processing system 450. Under an embodiment, the remote server application may offer access to remote users. Under an embodiment, a remote user may access the remote server application and retrieve/review data and data analytics using a desktop HTML client application. Remote users, such as managers, employees, or information technology (IT) professionals, may receive the device data through requests to remote server applications. Such users may then recommend, suggest, or implement certain maintenance, updates, upgrades, or other modifications to the device or the device software. In embodiments these modifications can be performed remotely by the remote users, such as through instructing the processing system 450 to perform the suggested or required maintenance, upgrades, updates or other modifications. Alternatively, the remote user may interact directly with the device 500 to perform the required or suggested maintenance. In certain embodiments, the remote user may instruct the processing system 450 to place a given device 500 in lockdown, which prevents routine use of the particular device 500. This can be particularly useful if the device data indicates to the user that the device is defective or has been compromised with malware.

In certain embodiments, the remote user may request or designate a given device 500 to receive a hardware modification. In these embodiments, when the processing system 450 receives such a designation instruction, the processing system 450 places the device in a modification mode, which prevents the device 500 from being checked out for routine use (such use as a mPOS). An authorized user may then access the device 500 using any of the various methods disclosed herein to perform the required or suggested hardware modification. Once the hardware modification is complete, the device 500 can be returned to an empty compartment of the device management cabinet 100, 200 using any of the methods disclosed herein and, once returned, the processing system 450 can permit routine use of the modified device 500.

Any of the various apparatuses, systems, or components disclosed herein can comprise a microcontroller. In such embodiments, the microcontroller can monitor and receives device data or data from transducers/sensors 138. The microcontroller may also send and receive data to memory. Under an embodiment, the microcontroller transmits data through transceiver to a remote server application running on a processor of a remote system.

The apparatuses, systems, and methods disclosed herein may also comprise user input options that allow the user to report any comments regarding the function of the device 500 during routine use of the same. In such embodiments, the user-reported data can be compiled with device data.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. In embodiments, exemplary mobile networks comprise broadband mobile networks. Mobile networks can include any generational network as identified or otherwise designated by the International Telecommunications Union (ITU). By way of example, a mobile network can comprise a 1G, 2G, 3G, and 4G, LTE, 5G, 6G, or any other network in compliance with any known cellular system standard that exists or is later developed. Computing devices coupled or connected to the network may comprise any microprocessor-controlled device that permits access to the network, including terminal devices, such as personal computers, workstations, servers, minicomputers, main-frame computers, laptop computers, mobile computers, palm top computers, hand-held computers, mobile phones, TV set-top boxes, or combinations thereof. The computer network may include one of more LANs, WANs, Internets, and computers. The computers may serve as servers, clients, or a combination thereof.

The apparatuses, systems, and methods disclosed herein can be a component of a single system, multiple systems, and/or geographically separate systems. The apparatuses, systems, and methods disclosed herein can also be a subcomponent or subsystem of a single system, multiple systems, and/or geographically separate systems. The components of the apparatuses, systems, and methods disclosed herein can be coupled to one or more other components (not shown) of a host system or a system coupled to the host system.

One or more components of the apparatuses, systems, and methods disclosed herein and/or a corresponding interface, system or application to which the apparatuses, systems, and methods disclosed herein is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system 450 of embodiments includes at least one processor and at least one memory device or subsystem. The processing system 450 can also include or be coupled to at least one database. The database can be internally disposed within the processing system or remotely accessed. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the apparatuses and methods disclosed herein can be located together or in separate locations. Any one or more of the various components of any system disclosed herein can be communicatively coupled to one another or to a remote system.

Aspects of the apparatuses and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs).

Some other possibilities for implementing aspects of the apparatuses and corresponding systems and methods disclosed herein include microcontrollers with memory (such as electronically erasable programmable read only memory (EEPROM)), embedded microprocessors, firmware, software, etc. Furthermore, aspects of the apparatuses and corresponding systems and methods disclosed herein can be embodied in microprocessors having software-based circuit emulation, discrete logic (sequential and combinatorial), custom devices, fuzzy (neural) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics.

Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above-described components may be processed by a processing entity 450 (e.g., one or more processors) within the computer system in conjunction with execution of one or more other computer programs.

The above description of embodiments of the apparatuses, systems, and methods disclosed herein is not intended to be exhaustive or to limit the apparatuses, systems, and methods to the precise forms disclosed. While specific embodiments of, and examples for, the apparatuses and corresponding systems and methods disclosed herein are described for illustrative purposes, various equivalent modifications are possible within the scope of the apparatuses, systems and methods, as those skilled in the relevant art will recognize. The teachings of the apparatuses and corresponding systems and methods provided herein can be applied to other systems and methods, not only for the systems and methods described above.

The elements and acts of the various embodiments described above can be combined to provide further embodiments. These and other changes can be made to the apparatuses, systems, and methods disclosed herein and corresponding systems and methods in light of the above detailed description.

EQUIVALENTS

Those skilled in the art will recognize, or be able to ascertain, using no more than routine experimentation, numerous equivalents to the specific substances and procedures described herein. Such equivalents are considered to be within the scope of this disclosure and are covered by the following claims.

What is claimed is:

1. A device management cabinet comprising:

a single user interface section and one or more cabinet compartment sections, the location of the user interface section being modular with respect to the one or more cabinet compartment sections;

a display;

a means for authenticating a user;

a processing system; and a single controller;

wherein:

the single user interface section comprises the display and the means for authenticating a user;

each cabinet compartment section comprises a plurality of locker compartments configured to secure a device therein, and each locker compartment comprises an interior space defined by a pair of side walls, a back wall, and a front door, a locking mechanism, and a data cable passing through an opening in the side wall or the back wall, wherein the data cable has a first connector configured to be operatively connected to the processing system and a second connector configured to be operatively connected to the device when the device is secured in the locker compartment, and the data cable is configured to charge a battery of the device and to transfer device data between the device secured in the locker compartment and the processing system, the device data comprising battery status of the device; and the processing system and the display are communicatively coupled with one another such that the device data received by the processing system is shown on the display, and the processing system is communicatively coupled with the locking mechanism of each locker compartment such that the processing system is configured to control the locking mechanism.

2. The device management cabinet of claim 1, wherein the means for authenticating a user comprises an electronic card reader, a biometric identification device, a user input mechanism, or a combination thereof.

3. The device management cabinet of claim 2, wherein the electronic card reader comprises a radio frequency identification reader.

4. The device management cabinet of claim 2, wherein the user input mechanism comprises a keypad, a keyboard, a touchscreen integrated within the display, or a combination thereof.

5. The device management cabinet of claim 1, further comprising one or more auxiliary cabinets, wherein each of the one or more auxiliary cabinets does not comprise a user interface, and at least one auxiliary cabinet is communicatively coupled to the processing system, wherein each of the one or more auxiliary cabinets comprises one or more auxiliary compartment sections, and each auxiliary compartment section comprises a plurality of auxiliary locker compartments, each auxiliary locker compartment comprising a locking mechanism and being configured to secure a device therein.

6. The device management cabinet of claim 1, the locking mechanism comprising a latchbolt and a latch receiver, wherein the latchbolt is disposed on the door of each locker compartment and the latchbolt is configured to be reversibly secured within a recess of the latch receiver.

7. The device management cabinet of claim 6, wherein the door is configured to open vertically in the downward direction when the latchbolt is released from the recess of the latch receiver.

8. The device management cabinet of claim 6, wherein the door is configured to open horizontally when the latchbolt is released from the recess of the latch receiver.

9. The device management cabinet of claim 5, wherein each of the auxiliary cabinets comprises an auxiliary cabinet PCB, and the auxiliary cabinet PCB is communicatively coupled to the processing system.

10. The device management cabinet of claim 5, comprising at least two auxiliary cabinets, wherein a first auxiliary cabinet is communicatively coupled directly to the processing system and a second auxiliary cabinet is communicatively coupled directly to the first auxiliary cabinet.

11. A device management system for managing access to one or more devices comprising:

a main device management cabinet that further comprises a single user interface section, one or more main cabinet compartment sections, a processing system, and single controller; and one or more auxiliary cabinets, each of the one or more auxiliary cabinets comprising one or more auxiliary compartment sections;

wherein the main cabinet compartment section and each auxiliary compartment section, comprise a plurality of locker compartments configured to secure a device therein and each locker compartment comprises an interior space defined by a pair of side walls, a back wall, and a front door, a locking mechanism, and a data cable passing through an opening in the side wall or the back wall, wherein the data cable has a first connector configured to be operatively connected to the processing system and a second connector configured to be operatively connected to the device when the device is secured in the locker compartment, and the data cable is configured to charge a battery of the device and to transfer device data between the device and the processing system, the device data comprising battery status of the device, battery life of the device, hours of use, and identification of users of the device;

the single user interface section comprises a user interface that further comprises a display and a means for authenticating a user; and the processing system and the display are communicatively coupled with one another such that at least one of the device data received by the processing system is shown on the display, and the processing system is communicatively coupled with the locking mechanism of each locker compartment such that the processing system is configured to separately control each locking mechanism.

12. The device management system of claim 11, wherein the means for authenticating a user comprises an electronic card reader, a biometric identification device, a user input mechanism, or a combination thereof.

13. The device management system of claim 12, wherein the electronic card reader comprises a radio frequency identification reader.

14. The device management system of claim 12, wherein the user input mechanism comprises a keypad, a keyboard, a touchscreen integrated within the display, or a combination thereof.

15. The device management system of claim 11, each locking mechanism comprising a latchbolt and a latch receiver, wherein the latchbolt is disposed on the door of each locker compartment and the latchbolt is configured to be reversibly secured within a recess of the latch receiver.

16. The device management system of claim 15, wherein the door is configured to open vertically in the downward direction when the latchbolt is released from the recess of the latch receiver.

17. The device management system of claim 15, wherein the door is configured to open horizontally when the latchbolt is released from the recess of the latch receiver.

18. The device management system of claim 11, wherein each of the auxiliary cabinets comprises an auxiliary cabinet PCB, and the auxiliary cabinet PCB is communicatively coupled to the processing system.

19. The device management system of claim 11, comprising at least two auxiliary cabinets, wherein a first auxiliary cabinet is communicatively coupled directly to the processing system and a second auxiliary cabinet is communicatively coupled directly to the first auxiliary cabinet.

20. The device management system of claim 11, wherein each main cabinet compartment section comprises at least five locker compartments, each auxiliary compartment section comprises at least five locker compartments, or a combination thereof.

* * * * *